(12) United States Patent (10) Patent No.: US 8,652,591 B2
Sera et al. (45) Date of Patent: Feb. 18, 2014

(54) RETARDATION FILM, POLARIZING PLATE USING SAME, AND LIQUID CRYSTAL DISPLAY DEVICE

(75) Inventors: Takashi Sera, Tokyo (JP); Takahiro Takagi, Kanagawa (JP); Shigeki Oka, Tokyo (JP); Ayako Inagaki, Tokyo (JP)

(73) Assignee: Konical Minolta Advanced Layers, Inc., Tokyo (JP)

( * ) Notice: Subject to any disclaimer, the term of this patent is extended or adjusted under 35 U.S.C. 154(b) by 0 days.

(21) Appl. No.: 13/814,881

(22) PCT Filed: Jun. 23, 2011

(86) PCT No.: PCT/JP2011/064381
§ 371 (c)(1),
(2), (4) Date: Feb. 7, 2013

(87) PCT Pub. No.: WO2012/026199
PCT Pub. Date: Mar. 1, 2012

(65) Prior Publication Data
US 2013/0135565 A1 May 30, 2013

(30) Foreign Application Priority Data

Aug. 21, 2010 (JP) ................................. 2010-185673
Nov. 30, 2010 (JP) ................................. 2010-266196

(51) Int. Cl.
*G02F 1/1335* (2006.01)
(52) U.S. Cl.
USPC .............................. 428/1.33; 349/96; 349/118
(58) Field of Classification Search
USPC ..................... 428/1.3–1.33; 349/96, 117–118
See application file for complete search history.

(56) References Cited

U.S. PATENT DOCUMENTS 2,689,799 A * 9/1954 Albus et al. ............... 106/169.39
3,495,998 A * 2/1970 Rose, Jr. et al. ............ 106/162.7
(Continued)

FOREIGN PATENT DOCUMENTS

EP 0-911-656 4/1999
EP 1813622 A1 * 8/2007 ............. C07H 13/06
(Continued)

*Primary Examiner* — Sophie Hon
(74) *Attorney, Agent, or Firm* — Lucas & Mercanti, LLP

(57) ABSTRACT

The purpose of the present invention is to provide: a retardation film which uses a low-substituted cellulose ester and has improved retardation after saponification and improved wet heat stability of internal haze; a polarizing plate which uses the retardation film; and a liquid crystal display device. An optical film of the present invention contains a cellulose ester and a compound represented by general formula (1), and is characterized in that the compound has an average degree of substitution within the range of 3.0-6.0 and contains a component having a degree of substitution of 4 or less in an amount of 30-80% by mass (inclusive). (In the formula, $R_1$-$R_8$ each represents a substituted or unsubstituted alkylcarbonyl group or a substituted or unsubstituted allylcarbonyl group, and $R_1$-$R_8$ may be the same as or different from one another.)

General Formula (1)

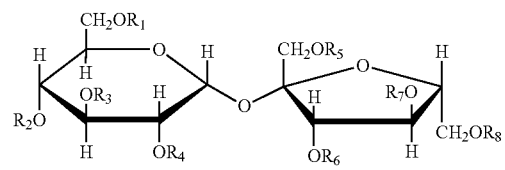

5 Claims, 2 Drawing Sheets

(56) References Cited

U.S. PATENT DOCUMENTS

2008/0268180 A1* 10/2008 Sera et al. .................. 428/1.1
2009/0068377 A1* 3/2009 Kuki .......................... 428/1.1
2010/0182548 A1* 7/2010 Suzuki et al. ............... 349/96
2010/0188622 A1* 7/2010 Suzuki et al. ............... 349/96

FOREIGN PATENT DOCUMENTS

| | | |
|---|---|---|
| JP | 2009-286931 | 12/2009 |
| WO | 2007/125764 | 11/2007 |
| WO | 2009/011228 | 1/2009 |

* cited by examiner

RETARDATION FILM, POLARIZING PLATE USING SAME, AND LIQUID CRYSTAL DISPLAY DEVICE

CROSS REFERENCE TO RELATED APPLICATION

This Application is a 371 of PCT/2011/064381 filed on Jun. 23, 2011 which, in turn, claimed the priorities of Japanese Patent Application Nos. JP2010-185673 filed on Aug. 21, 2010 and JP2010-266196 filed Nov. 30, 2010, all three applications are incorporated by reference herein.

TECHNICAL FIELD

The present invention relates to a retardation film and a polarizing plate and liquid crystal display device which employ it.

BACKGROUND ART

From the viewpoints of various advantages such as possibilities to make a size smaller and to make a film thinner with low voltage and low power consumption, liquid crystal display devices have been used widely for monitors of personal computers and mobile devices and televisions. In particular, in the liquid crystal displays used for televisions with a large screen expected to be viewed from various angles, demands fins view angle dependency become severe. Also, in recent years, performances requested for the liquid crystal displays used fire monitor become high. Accordingly, various modes are proposal so as to reduce view angle dependency by devising the arrangement state of liquid crystals in a liquid crystal cell. For example, according to the various studies of the liquid crystal display devices, an IPS (In-Plane Switching) mode, an OCB (Optically Compensatory Bend) mode, a VA (Vertically Aligned) mode, and the like are proposed.

As compared with other polymer films, since cellulose ester films are rich in moisture permeability, have high adhesive properties for the polarizer of the polarizing plate for which PVA with high hydrophilicity is generally used, and have high optical isotropic nature, the cellulose ester films are generally used as protective films for polarizing plates employed in various liquid crystal display devices. Accordingly, provision of the function of retardation films to the cellulose ester films enables to enhance visibility with a simple constitution without increasing the number of components.

Patent Document 1 discloses a retardation film provided with a desired retardation value by the addition of a retardation increasing agent to cellulose triacetate.

In the case where a retardation film is produced by stretching a cellulose ester film made for which a mixed fatty acid ester of cellulose with comparatively high processing adaptability such as cellulose acetate propionate is used as a raw material, Ro values can be made in a reversed-wavelength dispersibility.

On the other hand, cellulose esters are most inferior in moisture resistance. In particular, in the case where a total degree of substitution of acyl groups is lowered, for example, in the case of lowering it to 2.55 or less (hereafter, referred to as low-substituted cellulose ester), moisture vapor transmission and water content become high as compared with high-substituted cellulose ester. Accordingly, problems arise such that variations in dimension and retardation value during use become large.

As a means for solving these problems, it is known to improve the humidity stability of the retardation values of cellulose ester film to some extant by using a sugar ester compound as an additive of the cellulose ester film (for example, refer to Patent Document 2).

However, in a polarizing plate produced by applying saponification treatment to this retardation film and pasting the treated retardation film on a polarizer, new problems arise. For example, optical variations, such as the slippage of an optical axis (also referred to as "axis slippage) which causes the lowering of contrast and retardation variation, occur. Further, when the polarizing plate is placed under the environment of moisture and heat, inner dispersion occurs with an increase in inner haze. As a result, the retardation film is not in the state of satisfying the requirements as a retardation film.

RELATED ART DOCUMENT

Patent Document

[Patent Document 1] Europe patent 0911656 A2 Specification
[Patent Document 2] International Patent Publication WO2007/125764

SUMMARY OF THE INVENTION

Problems to be Solved by the Invention

Therefore, an object of the present invention is to provide a retardation film which includes cellulose esters and has little optical variation, and further after saponification treatment, has little retardation variation and improved humidity and heat stability of inner haze, and to provide a polarizing plate and a liquid crystal display device which employ the retardation film.

Means for Solving the Problems

The above object of the present invention is attained by the following constitution.

1. A retardation film is characterized in that the retardation film is an optical film containing a cellulose resin and a compound represented by the following general formula (1), and the compound has an average degree of substitution of 3.0 to 6.0 and contains a component with a degree of substitution of 4 or less in an amount of 30 weight % to 80 weight %.

General Formula (1)

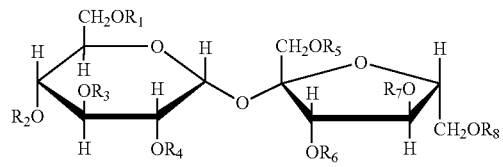

(in the formula, $R_1$ to $R_8$ each represents a substituted or unsubstituted alkyl carbonyl group or a substituted or unsubstituted allyl carbonyl group, and $R_1$ to $R_8$ may be the same with or different from each other).

2. The retardation film described in the above (1) is characterized by containing an ester compound represented by the following general formula (2).

$$B\text{-}(G\text{-}A)_n\text{-}G\text{-}B \qquad \text{General formula (2)}$$

(in the formula, B represents a hydroxy group or a carboxylic acid residue; G represents an alkylene glycol residue with 2 to 12 carbons, an aryl glycol residue with 6 to 12 carbons, or an oxy alkylene glycol residue with 4 to 12 carbons; and A represents an alkylene dicarboxylic acid residue with 4 to 12 carbons, or an aryl dicarboxylic acid residue with 6 to 12 carbons. "n" represents an integer of 1 or more.)

3. The retardation film described in the above (1) or (2) is characterized in that in the compound represented by the general formula (1), a content mass ratio of a component with a degree of substitution of 8.0 is 2% or less.

4. A polarizing plate is characterized in that the retardation film described in any one of the above (1) to (3) is used on at least one surface of a polarizer.

5. A liquid crystal display device is characterized in that the polarizing plate described in the above (4) is used on at least one surface of a liquid crystal cell.

The Effect of Invention

According to the present invention, it can be possible to provide a retardation film which includes cellulose esters and has little optical variation, and further after saponification treatment, has little retardation variation and improved humidity and heat stability of inner haze, and to provide a polarizing plate and a liquid crystal display device which employ the retardation film.

EMBODIMENT FOR CARRYING OUT THE INVENTION

Figure 1:
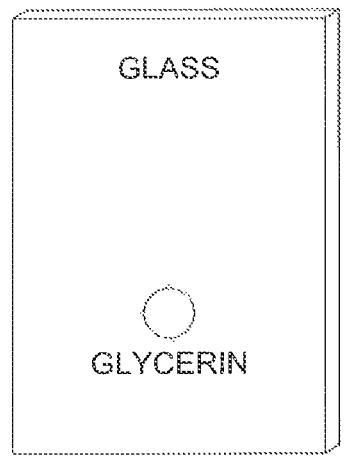
FIG. 1 is a schematic diagram showing a state that glycerol is dropped on a slide glass.

Hereafter, the present invention is described in detail.
<Optical Variation>

The optical variation means a gap between a slow axis of the retardation film of the present invention and an absorption axis of a polarizer and variations of retardation, and is evaluated by minute light leakage. As the minute light leakage is smaller, the optical variation is evaluated as being smaller.

The minute light leakage can be calculated by measuring an in-plane retardation value Ro and a slow axis direction $\Phi$ on each portion of a film with a minute pitch of 0.5 μm or less (wavelength or less).

In a specific measuring method, a retardation film is subjected to moisture control for 24 hours under the environment of 23° C. and a relative humidity of 55±3%. Thereafter, the retardation value and the slow axis direction are measured with a pitch of 0.5 μm or less in a range of 100 μm square by use of as light source with an average wavelength λ, thereby obtaining Ro and $\Phi$. Subsequently, the minute light leakage X can be calculated in accordance with the following formulas by using these values.

$$\Delta\phi = |\phi - (\sum \phi)/N|$$

-continued $$X = \left(\sum \sin^2 2\Delta\phi \times \sin^2 \frac{\pi Ro}{\lambda}\right)/N$$

In the above formula, N represents the number of measured points. The minute light leakage is measured at 10 points with an equal distance in the width direction of the film, and the average value of ten measurements is made to Xa.

In the present invention, Xa is preferably $2.5 \times 10^{-7}$ or less, more preferably $2.0 \times 10^{-7}$ or less, and particularly preferably $1.5 \times 10^{-7}$ or less.

If a measuring device can measure Ro and $\Phi$ with a pitch of 0.5 μm or less, the measuring device may be employed with no comment. However, the following apparatus may be employed.

An apparatus which uses a device in which a light source, a lower polarizing plate, a sample, an objective lens, and a camera equipped with an integrated polarizing plate of photonic crystals (an absorption axis is changed for each pixel of CCD) arranged in this order in a transmission type microscope, and measures retardation values and a slow axis direction through an analyzing method similar to a rotating analyzer method.

A retardation measuring apparatus such as Abrio-IM (manufactured by HINDS Instruments Corporation) in which a liquid crystal retarder modulating method is combined with a transmission type microscope.

A retardation measuring apparatus in which a light source, a lower polarizing plate, a wavelength plate equipped with a rotation mechanism, a sample, an objective lens, a rotation type wavelength plate, an upper polarizing plate arranged to have an absorption axis in a direction parallel to the lower polarizing plate, and a CCD camera are arranged in this order in a transmission type microscope, and which measures Ro and $\Phi$ by calculating a Muller matrix.

An orientation angle measuring apparatus in which a light source, a lower polarizing plate, a sample placed on a stage stand equipped with a rotation mechanism, an objective lens, an upper polarizing plate arranged to have an absorption axis in a direction perpendicular to the lower polarizing plate, and a CCD camera are arranged in this order in a transmission type microscope (in this case, with the supposition that Ro needed at the time of calculating X is almost constant in a range of 100 μm square, a value measured separately by other retardation measuring apparatus is used).

In this connection, preferably, the CCD camera has 400,000 pixels; the polarizing plate has an extinction ratio of $10^{-4}$ or less; the objective lens has a magnification ratio of ten times or more; a measuring wavelength λ is 520 to 560 nm; and the rotation mechanism has an accuracy of ±0.1 or less.

<Inner Haze>

The term "inner haze" used in the present invention means haze generated by scattering factors exiting inside a film, and the term "inside" means portions separating by 5 μm or more from the surface of a film.

This inner haze is measured with a haze meter in the state that a solvent with a refractive index of ±0.05 is dropped on the surface of a film such that haze on the surface of the film is made negligible.

<Apparatus for Measuring Haze (Hereafter, Abbreviated to "Inner Haze") at the Inside of a Film>

Haze meter (turbidity meter) (type: NDH 2000, manufactured by Nippon Denshoku Industries Co., Ltd.)

The light source includes a halogen bulb (5V, 9 W), and the light receiving unit includes a silicon photo cell equipped with a relative luminosity filter.

In the present invention, in the measurement of haze on a film on the condition that a solvent with a refractive index of ±0.05 is dropped on the surface of the film in this apparatus, the value of the haze is preferably 0.02 or less. The measurement is performed under the atmosphere of 23° C. and 55% RH in accordance with JIS K-7136.

The measurement of inner haze is performed as follows. Description will be given with reference to FIGS. 1 to 4.

First, blank haze 1 of a measuring instrument other than a film is measured.

Figure 2:
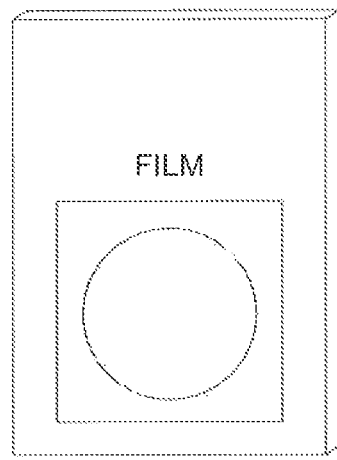
FIG. 2 is a schematic diagram showing a state that as sample film is placed on the glycerol.
Figure 3:
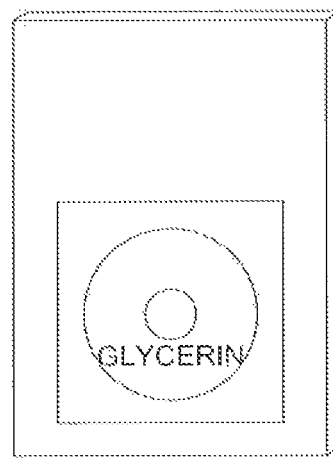
FIG. 3 is a schematic diagram showing a state that glycerol is dropped on the sample film.
Figure 4:
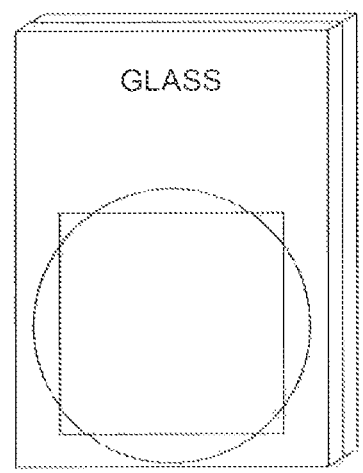
FIG. 4 is a schematic diagram showing a state that a covers glass is placed on the glycerol.

1. Drop one droplet (0.05 ml) of glycerol on a cleaned slide glass. At this time, care is taken so as not to make air hubbies enter the droplet. Even if a slide glass is visually clean, it may be dirty. Accordingly, a slide glass cleaned with detergent should be used. Refer to FIG. 1.
2. Place a cover glass on the glycerol. The glycerol may spread without being pressed with the cover glass.
3. Set it on a haze meter, and measure blank haze 1.
   Subsequently, haze 2 including a sample is measured.
4. Drop glycerol on a slide glass. (0.05 ml)
   Refer to FIG. 1.
5. Place a sample film on the glycerol.
   Refer to FIG. 2.
6. Drop glycerol on the sample film. (0.05 ml)
   Refer to FIG. 3.
7. Place a cover glass on it.
   Refer to FIG. 4.
8. Set it on a haze meter, and measure haze 2.
9. Calculate (inner haze)=(haze 2)−(haze 1)

The glass and the glycerol used in the above-mentioned measurement are as follows.

Glass: MICRO SLIDE GLASS S9213 MATSUNAMI

Glycerol: Special grade, manufactured by Kanto Chemical Co., Inc.

<Compound Represented by the General Formula (1)>

The compound (hereafter, also referred to as sugar ester compound) of the present invention represented by the general formula (1) is characterized by having an average degree of substitution of 3.0 to 6.0 and containing a component with a degree of substitution of 4 or less in an amount of 30 weight % to 80 weight %.

In the present invention, the degree of substitution of the compound represented by the general formula (1) represents a number of hydroxyl groups substituted by a substituent group other than hydrogen among eight hydroxyl groups contained in the compound represented by the general formula (1). Namely, the degree of substitution represents the number of groups other than hydrogen among $R_1$ to $R_8$ in the general formula (1). Accordingly, when all of $R_1$ to $R_8$ are substituted by a substituent group other than hydrogen, the degree of substitution becomes 8 being the maximum value. On the other band, when each of $R_1$ to $R_8$ is a hydrogen atom, the degree of substitution becomes 0.0.

In the present invention, the average degree of substitution of the compound represented by the general formula (1) needs to be 3.0 to 6.0. It is proper to use the average degree of substitution as the degree of substitution of the compound represented by the general formula (1). The average degree of substitution can be calculated from an area ratio in a chart showing the distribution of the degree of substitution by a high speed liquid chromatography in accordance with the following method.

In the present invention, in consideration of only a retardation expressing property, it is preferable that the degree of substitution of a sugar ester compound is higher. However, in consideration of moisture resistance and inner haze, it is found out to be preferable that the average degree of substitution is slightly low and the sugar ester compound is a mixture of components with a degree of substitution being low.

The presumed effect mechanism of the above matter is that the retardation expressing property and the compatibility with cellulose esters are attained by mixing compounds with similar structures.

The average degree of substitution is more preferably 4.0 or more, and components with a degree of substitution being four or loss is preferably 35 mass % or more.

In the general formula (1), $R_1$ to $R_8$ each represents a substituted or unsubstituted alkyl carbonyl group or a substituted or unsubstituted allyl carbonyl group. That is, $R_1$ to $R_8$ each represents an acyl group. $R_1$ to $R_8$ may be the same with or different from each other (hereafter, $R_1$ to $R_8$ are also referred to as an acyl group.

As the sugars of the synthetic raw materials of the sugar ester compounds according to the present invention, the following compounds may be used. However, the present invention should not be limited to these compounds.

Examples of the sugars include glucose, galactose, mannose, fructose, xylose, or arabinose, lactose, sucrose, nystose, 1F-fructosylnystose, stachyose, maltitol, lactitol, lactulose, cellobiose, maltose, cellotriose, maltotriose, raffinose and kestose.

In addition, gentiobiose, gentiotriose, gentiotriose, xylotriose, and galactosyl-sucrose may be employed.

Monocarboxylic acids to be used to esterify all or a part of OH groups of the pyranose structure or the furanose structure of the present invention, are not specifically limited, and known aliphatic monocarboxylic acids, alicyclic monocarboxylic acids and aromatic monocarboxylic acids may be used. The used monocarboxylic acids may be a single kind or may be a mixture of two or more kinds.

Examples of preferable aliphatic monocarboxylic and include saturated fatty acids such as acetic acid, propionic acid, butylic acid, isobutylic acid, valerianic acid, capronic acid, enanthic acid, caprylic acid, pelargonic acid, capric acid, 2-ethyl-hexanecarboxylic acid, undecylic acid, lauric acid, tridecylic acid, myristic acid, pentadecylic acid, palmitic acid, heptadecylic acid, stearic acid, nonadecanic acid, arachidic acid, behenic acid, lignoceric acid, cerotic acid, heptacosanoic acid, montanic acid and melissic acid, and unsaturated fatty acids such as undecylic acid, oleic acid, sorbic acid, linolic acid, linolenic acid, arachidonic acid and octenic acid.

Examples of preferable alicyclic monocarboxylic acid, include acetic acid, cyclopentane carboxylic acid, cyclohexane carboxylic acid, cycle octane carboxylic acid, and derivatives of them.

Examples of preferable aromatic monocarboxylic acid include benzoic acid, an aromatic monocarboxylic acid formed by introducing one to five alkyl or alkoxy groups into the benzene ring of benzoic acid such as toluic acid, an aromatic monocarboxylic acid having two or more benzene rings such as cinnamic acid, benzilic acid, biphenyl carboxylic acid, naphthalene carboxylic acid, tetralin carboxylic acid and derivatives of them. Particularly, benzoic acid is preferable.

A part of specific examples according to the present invention is shown below. However, these are samples in the case where each of $R_1$ to $R_8$ is made to the same substituent R, the present invention is not limited to these samples.

| Compound No. | R | Average degree of substitution |
|---|---|---|
| 1-1 | —C(=O)—CH₃ | 3.3 |
| 1-2 | —C(=O)—CH₃ | 4.2 |
| 1-3 | —C(=O)—CH₃ | 5.7 |
| 1-4 | —C(=O)—CH₃ | 6.0 |
| 1-5 | —C(=O)—C₆H₅ | 3.5 |
| 1-6 | —C(=O)—C₆H₅ | 4.0 |
| 1-7 | —C(=O)—C₆H₅ | 5.5 |
| 1-8 | —C(=O)—C₆H₅ | 6.0 |
| 1-9 | —C(=O)—C₆H₄—CH₃ | 3.2 |
| 1-10 | —C(=O)—C₆H₄—CH₃ | 4.4 |
| 1-11 | —C(=O)—C₆H₄—CH₃ | 5.5 |
| 1-12 | —C(=O)—C₆H₄—CH₃ | 6.0 |
| 1-13 | —C(=O)—CH₂—C₆H₅ | 3.0 |
| 1-14 | —C(=O)—CH₂—C₆H₅ | 4.0 |
| 1-15 | —C(=O)—CH₂—C₆H₅ | 5.5 |
| 1-16 | —C(=O)—CH₂—C₆H₅ | 6.0 |
| 1-17 | —C(=O)—C₆H₂(OCH₃)₃ | 3.1 |
| 1-18 | —C(=O)—C₆H₂(OCH₃)₃ | 4.7 |
| 1-19 | —C(=O)—C₆H₂(OCH₃)₃ | 5.3 |
| 1-20 | —C(=O)—C₆H₂(OCH₃)₃ | 6.0 |
| 1-21 | —C(=O)—CH(CH₃)CH₃ | 3.5 |
| 1-22 | —C(=O)—CH(CH₃)CH₃ | 4.6 |
| 1-23 | —C(=O)—CH(CH₃)CH₃ | 5.6 |
| 1-24 | —C(=O)—CH(CH₃)CH₃ | 6.0 |

The sugar ester compound of the present invention can be manufactured by making an acylating agent (also referred to as an esterizing agent, for example, acid halide of acetyl chloride and anhydride of acetic anhydride) react with sugar esters. The desired distribution of a degree of substitution may be accomplished by adjustment of the amount of an acylating agent, an addition timing, and esterification reaction time. Further, the target average degree of substitution and components with a degree of substitution of four or less may be adjusted by mixing sugar ester compounds different in degree of substitution or by mixing compounds which are purely isolated and different in degree of substitution.

Synthesis Example

Synthesis Example of Compound of the Present Invention

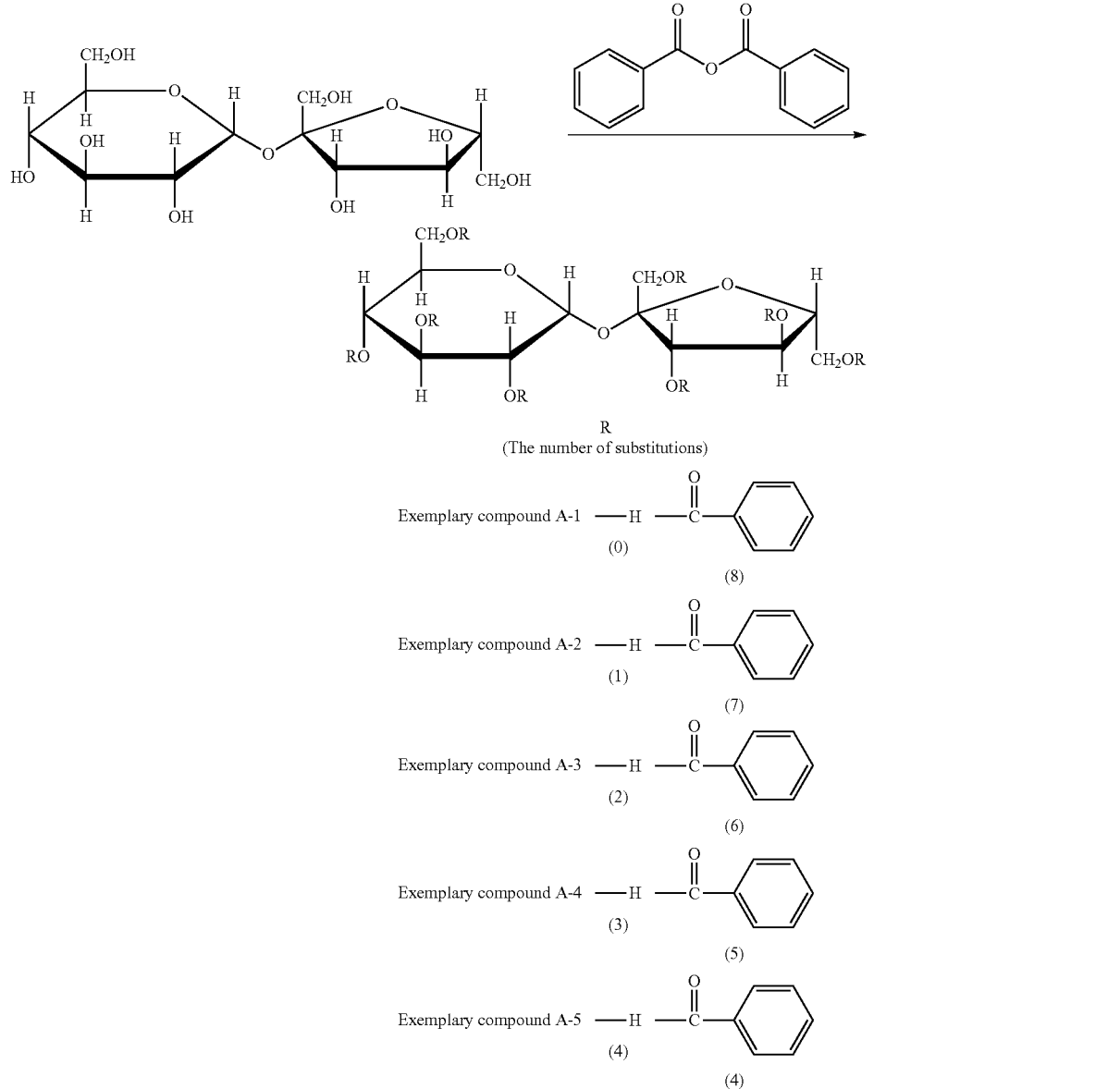

Into a four-head flask equipped with a stirring device, a reflex cooling device, a thermometer, and a nitrogen gas introducing pipe, 34.2 g (0.1 mol) of cane sugar, 135.6 g (0.6 mol) of benzoic acid anhydride, and 284.8 g (3.6 mol) of pyridine were put, followed by stirring and raising temperature while bubbling nitrogen gas through the nitrogen gas introducing pipe, thereby conducting an esterification reaction at 70° C. for 5 hours.

Next, a pressure in the flask was reduced to $4 \times 10^2$ Pa or less, and superfluous pyridine was distilled away at 60° C., and then, the pressure in the flask was reduced to $1.3 \times 10$ Pa or less, the temperature was raised to 120° C., thereby distilling away the benzoic acid anhydride and the large portion of produced benzoic acid. Subsequently, 1 L of toluene and 300 g of 0.5 mass % sodium carbonate aqueous solution were added, followed by stirring at 50° C. for 30 minutes and leaving at rest, thereby separating a toluene layer. Lastly, into the separated toluene layer, 100 g of water was added, followed by water washing at a room temperature for 30 minutes, thereby separating a toluene layer. Then, toluene was distilled away at 60° C. under a reduced pressure ($4 \times 10^2$ Pa or less), thereby obtaining a sugar ester compound 1 being a mixture of compounds A-1, A-2, A-3, A-4 and A-5.

As a result of analysis for the obtained mixture through mass analysis (HPLC-MS) with high performance liquid chromatography, A-1 was 1.2 mass %, A-2 was 13.2 mass %, A-3 was 14.2 mass %, A-4 was 35.4 mass %, and A-5 was 40.0 mass %. Further, the average degree of substitution was 5.2.

Similarly, by making 158.2 g (0.7 mol), 146.9 g (0.65 mol), 135.6 g (0.60 mol), and 124.3 g (0.55 mol) of benzoic acid anhydride react with respective equivalent amounts of pyridine, respective sugar ester components shown in Table 1 were obtained.

TABLE 1

|  | Mole of benzoic acid anhydride | | | |
| --- | --- | --- | --- | --- |
| Content (mass %) | 0.70 | 0.65 | 0.60 | 0.55 |
| A-1 | 7.3 | 2.3 | 1.2 | 0.5 |
| A-2 | 28.4 | 18.8 | 13.2 | 7.0 |
| A-3 | 29.0 | 17.8 | 14.2 | 9.4 |
| A-4 | 26.4 | 34.0 | 35.4 | 26.5 |
| A-5 and the like | 8.8 | 27.1 | 40.0 | 56.7 |
| Average degree of substitution | 6.0 | 5.4 | 5.2 | 4.7 |

Subsequently, some of the obtained mixtures was refined by column chromatography using a silica gel, whereby A-1, A-2, A-3, A-4, and A-5 each with a grade of purity of 100% were obtained.

In this connection, A-5 grade means all components each with a degree of substitution of 4 or less, i.e., a mixture of compounds with respective degrees of substitutions of 4, 3, 2, and 1. Further, an average degree of substitution was calculated on the assumption that a degree of substitution of the A-5 grade was 4.

In the present invention, an average degree of substitution was adjusted by combining and adding the sugar ester which had an average degree of substitution near a desired average degree of substitution by the procedure produced here and the isolated A-1 to A-5 grade.

<Measurement Condition of HPLC-MS>
1) LC Section
   Apparatus a column oven (JASCO CO-965) manufactured by Jasco Corporation, a detector (JASCO UV-970-240 nm), a pump (JASCO PU-980), a degasser (JASCO DG-980-50)
   Column: Inertsil ODS-3, particle diameter of 5 μm, 4.6× 250 mm (manufactured by GL Sciences)
   Column temperature: 40° C.
   Flow rate: 1 ml/min
   Mobile phase: THF (1% acetic acid):$H_2O$ (50:50)
   Injection amount: 3 μl
2) MS Section
   Apparatus: LCQ DECA (manufactured by Thermo Quest Corporation)
   Ionizing method: Electro-spray ionization (ESI) method
   Spray Voltage: 5 kV
   Capillary temperature: 180° C.
   Vaporizer temperature: 450° C.

<Cellulose Ester>

Examples of the cellulose ester which can be used for an optical film of the present invention, include cellulose triacetate, cellulose diacetate, cellulose ester propionate, and the like which can be used for the known optical film.

From the viewpoints that even if a high retardation is expressed, a stretching rate can be suppressed to be low and trouble such as fracture can be avoided, the present invention exhibits effect remarkably in the case where cellulose esters have a degree of substitution of total acyl groups being 2.00 to 2.55. The presumed reason to admit the remarkable effect is that the cellulose esters with a degree of substitution in the above range are originally inferior in moisture resistant properties.

In the case where a cellulose ester has a degree of substitution of total acyl groups (i.e., a degree of substitution of an acetyl group) less than 2.00, the following troubles may occur. The quality of a film surface deteriorates due to an increase of dope viscosity, and haze up occurs due to an increase of stretching stress. On the other hand, in the case where a degree of substitution of total acyl groups is larger than 2.55, it may be difficult to obtain a required retardation. The measuring method of a degree of substitution of acyl groups may be performed in accordance with ASTM D-817-91, and a degree of substitution of total acyl groups is preferably 2.2 to 2.45.

The number average molecular weight (Mn) of cellulose esters is preferably in a range of 30,000 to 300,000, because the mechanical strength of an obtained film becomes strong. Further, cellulose esters with 50,000 to 200,000 are preferably employed.

The ratio of Mw/Mn of the weight average molecular weight (Mw) and number average molecular weight (Mn) of cellulose esters is preferably 1.4 to 3.0.

The number average molecular weight (Mn) and weight average molecular weight (Mw) of cellulose esters were measured by using a gel permeation chromatography (GPC).

The measuring conditions are as follows:
Solvent: Methylene chloride
Column: Shodex K806, K805, K803G (manufactured by Showa Denko KK). Three columns were used in connection.
Column temperature: 25° C.
Sample concentration: 0.1 mass %
Detector: RI Model 504 (manufactured by GL Science)
Pump: L6000 (manufactured by Hitachi Ltd.)
Flow rate: 1.0 ml/min.
Calibration curve: Standard polystyrene STK (manufactured by Tosoh Corporation). Calibration curve using 13 samples of Mw=1,000,000 to 500. 13 samples should preferably be spaced approximately equally.

Examples of cellulose of the raw material of cellulose esters include, without being specifically limited thereto, cotton linter, wood pulp (originated from needle-leaf tree and broadleaf tree), ambari, and the like. The cellulose esters obtained from those may be used by being mixed with an arbitrary mixture rate.

The cellulose esters relating to the present invention can be manufactured by a well-known procedure. In particular, the cellulose esters can be synthesized with reference to methods described in, for example, Japanese Unexamined Patent Publication Nos. 10-45804, 2009-161701.

Examples of the commercially-available products include L20, L30, L40, L50 manufactured by Daicel Corporation, Ca398-3, Ca398-6, Ca398-10, Ca398-30, and Ca394-60S manufactured by Eastman Chemical Inc.

<Ester Compound Represented by the General Formula (2)>

From the viewpoint of the retardation stability a polarizing plate specifically under an environmental change, it is desirable that the optical film of the present invention contains the ester compound represented by the following general formula (2).

B-(G-A)$n$-G-B       General formula (2)

(in the formula, B represents a hydroxy group or a carboxylic acid residue; G represents an alkylene glycol residue with 2 to 12 carbons, an aryl glycol residue with 6 to 12 carbons, or an oxy alkylene glycol residue with 4 to 12 carbons; and A represents an alkylene dicarboxylic acid residue with 4 to 12 carbon an aryl dicarboxylic acid residue with 6 to 12 carbons. "n" represents an integer of 1 or more.)

Examples of the alkylene glycol component having 2 to 12 carbons in the general formula (2) include: ethylene glycol, 1,2-propylene glycol, 1,3-propylene glycol, 1,2-butanediol, 1,3-butanediol, 2-methyl, 1,3-propanediol, 1,4-butanediol, 1,5-pentanediol, 2,2-dimethyl-1,3-propanediol (also known as neopentylglycol), 2,2-diethyl-1,3-propanediol (also known as 3,3-dimethylol pentane), 2-n-butyl-2-ethyl-1,3-propanediol (also known as 3,3-dimethylol heptane), 3-methyl-1,5-pentanediol-1,6-hexanediol, 2,2,4-trimethyl-1,3-pentanediol, 2-ethyl-1,3-hexanediol, 2-methyl-1,8-octanediol, 1,9-nonanediol, 1,10-decanediol, 1,12-octadecanediol, which may be used alone or in combination of two or more glycols.

Since alkylene glycol having 2 to 12 carbons is especially excellent in compatibility with cellulose ester, it is especially desirable.

Examples of the aryl glycol component with 6 to 12 carbons include: hydroquinone, resorcinol, bisphenol A, bisphenol F, bisphenol, and the like, and these glycol can be used as a single kind or a mixture of two or more kinds.

Examples of the oxyalkylene glycol component having 4 to 12 carbons include: diethylene glycol, triethylene glycol, tetraethylene glycol, dipropylene glycol and tripropylene glycol, which may be used alone or in combination of two or more glycols.

Examples of the alkylene dicarboxylic acid component having 4 to 12 carbons include: succinic acid, maleic acid, the fumaric acid, glutaric acid, adipic acid, azelaic acid, sebacic acid and dodecane dicarboxylic acid, which may be used alone or in combination of two or more acids. Examples of the arylene dicarboxylic acid component having 6 to 12 carbons include: phthalic acid, terephthalic acid, 1,5-naphthalene dicarboxylic acid, 1,4-naphthalene dicarboxylic acid, and 2,6-naphthalene dicarboxylic acid.

Although the specific compounds of the ester compound represented by the general formula (2) used in the present invention are shown below, the present invention is not limited to these compounds.

2-1
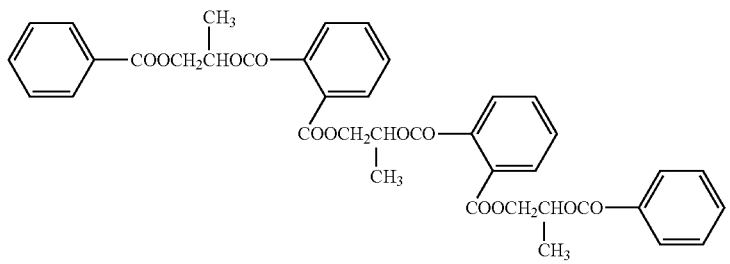
Mw: 696

2-2
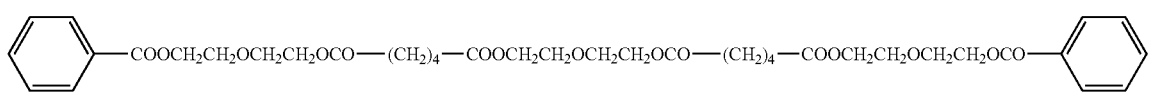
Mw: 746

2-3
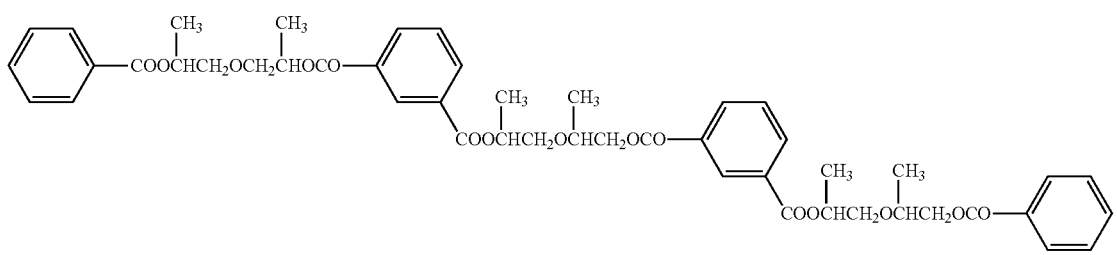
Mw: 830

2-4
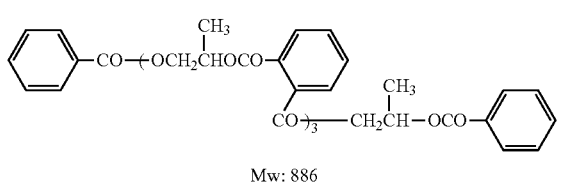
Mw: 886

2-5
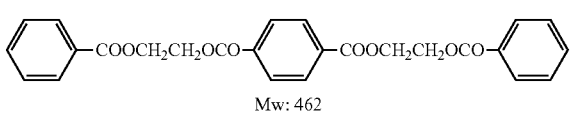
Mw: 462

2-6
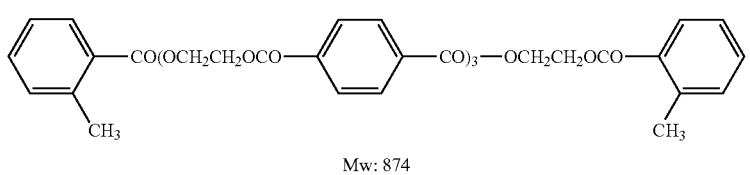
Mw: 874

2-7
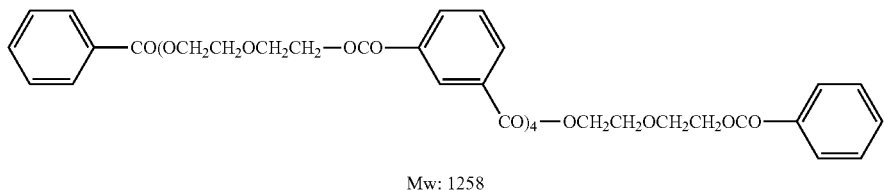
Mw: 1258
2-8
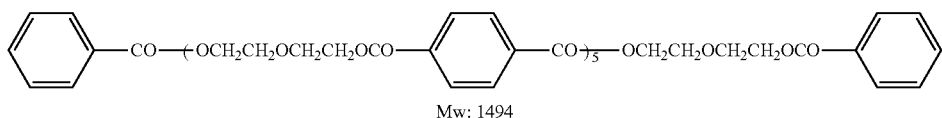
Mw: 1494
2-9
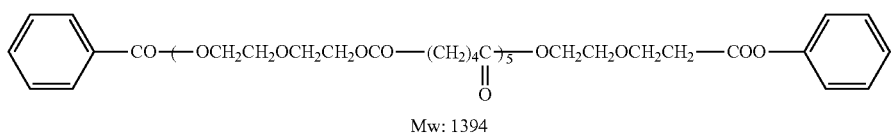
Mw: 1394
2-10
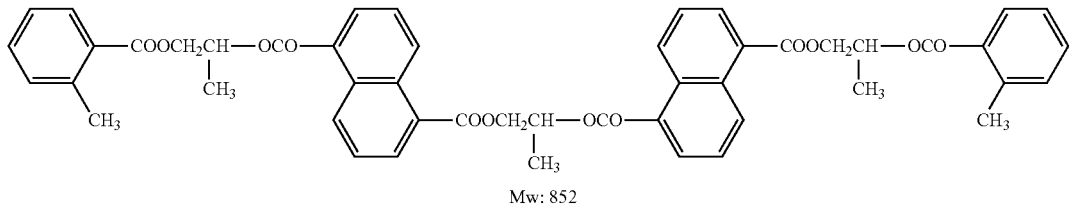
Mw: 852
2-11
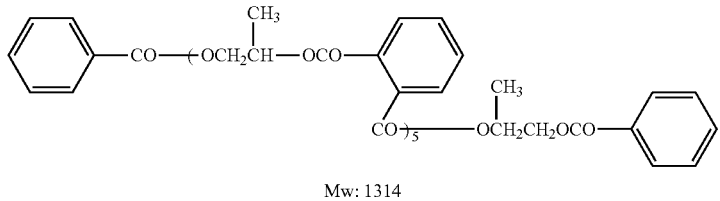
Mw: 1314
2-12
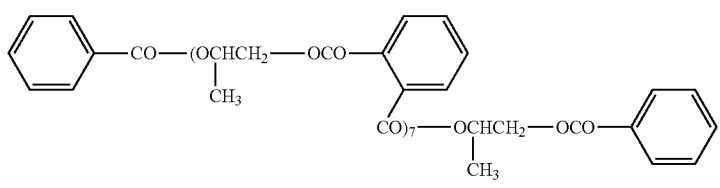
Mw: 1726
2-13
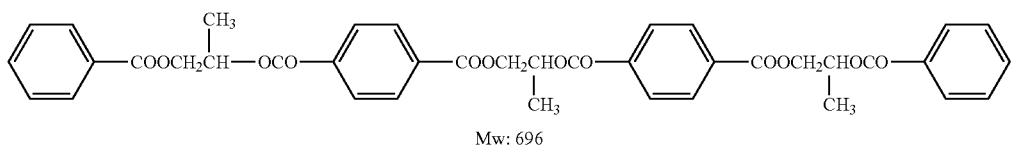
Mw: 696
2-14
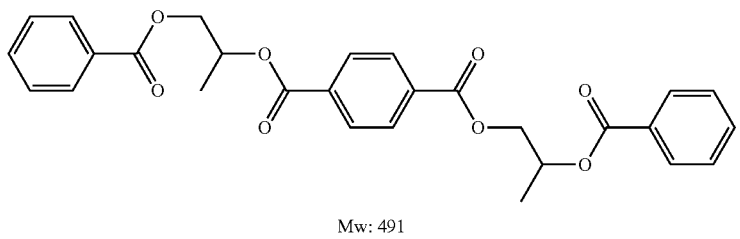
Mw: 491

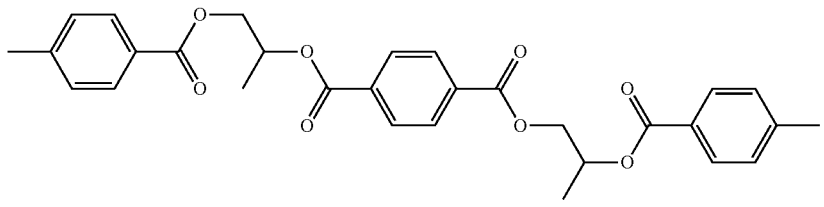

Mw: 519

2-15

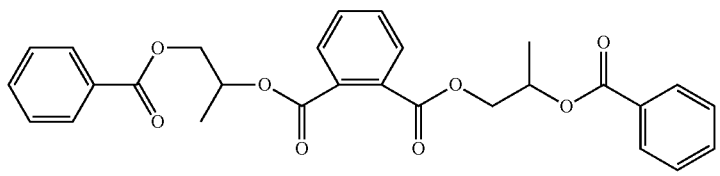

Mw: 491

2-16

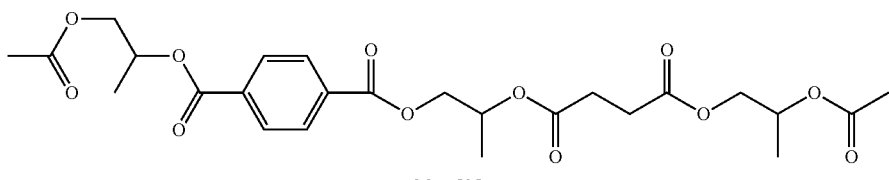

Mw: 525

2-17

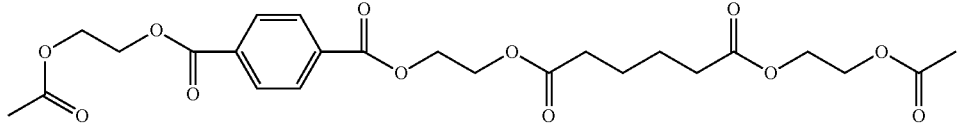

Mw: 510

2-18

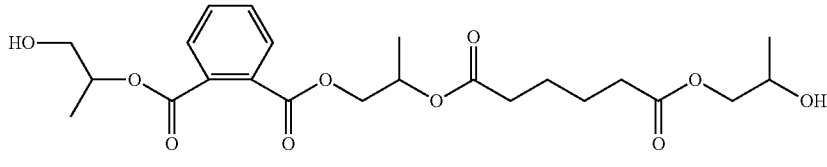

Mw: 469

2-19

<Other Additives>

(Plasticizer)

The retardation film of the present invention may contain plasticizers in addition to the compound represented by the general formula (2) in response to necessity in order to acquire the effects of the present invention.

The plasticizer is not specifically limited, however, is preferably selected from a polycarboxylic ester type plasticizer, a glycolate type plasticizer, a phthalic ester type plasticizer, a fatty acid ester type plasticizer, a polyhydric alcohol ester type plasticizer, a polyester type plasticizer, an acryl type plasticizer, and the like.

In the case where two or more type plasticizers among them are used, at least one type is preferably a polyalcohol ester type plasticizer.

The polyalcohol ester type plasticizer is a plasticizer composed of an ester of an aliphatic polyalcohol with a valence of two or more and a monocarboxylic acid, and preferably includes an aromatic ring or a cycloalkyl ring in a molecule. Preferably, the polyalcohol ester type plasticizer is an aliphatic polyalcohol ester with a valence of 2 to 20.

The polyalcohol preferably used in the present invention is represented by the formula (a).

$$R_{11}—(OH)_n \qquad \text{Formula (a)}$$

Herein, $R_{11}$ represents an organic acid with a valence of n, n represents a positive integer of 2 or more, and an OH group represents an alcoholic and/or a phenolic hydroxyl group.

As examples of the preferable polyalcohol, the followings may be listed. However, the present invention is not limited thereto.

The examples include adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethylol propane, trimethylol ethane and xylitol.

In particular, triethylene glycol, tetraethylene glycol, dipropylene glycol, tripropylene glycol, sorbitol, trimethylolpropane, and xylitol are preferable.

A mono carboxylic acid to be used for the polyalcohol ester is not specifically limited, and well known compounds such as aliphatic monocarboxylic acids, alicyclic monocarboxylic acids, and aromatic monocarboxylic acids may be used. An alicyclic monocarboxylic acid or an aromatic monocarboxylic acid is preferably used in the point of improving moisture permeability and retention of additives.

As examples of the preferable monocarboxylic acids, the followings may be listed. However, the present invention is not limited thereto.

As aliphatic monocarboxylic acids, straight or blanched fatty acids with 1 to 32 carbons are preferably used. The number of carbons is more preferably from 1 to 20 and still more preferably from 1 to 10. The addition of an acetic acid preferably increases the compatibility with cellulose esters, and the acetic acid is preferably used by being mixed with other monocarboxylic acids.

Examples of the preferable aliphatic monocarboxylic acids include saturated fatty acids such as: acetic acid, propionic acid, butyric acid, valeric acid, caproic acid, enanthic acid, caprylic acid, pelargonic acid, capric acid, 2-ethyl-hexanoic acid, undecylic acid, lauric acid, tridecylic acid, myristic acid, pentadecylic acid, palmitic acid, heptadecanoic acid, stearic acid, nonadecane acid, arachidic acid, behenic acid, lignoceric acid, cerotinic acid, heptacosanoic acid, montanic acid, melissic acid, lacceric acid, and unsaturated fatty acids such as: undecylic acid, oleic acid, sorbic acid, linoleic acid, linolenic acid and arachidonic acid.

Examples of the preferable alicyclic monocarboxylic acids include: cyclopentanecarboxylic acid, cyclohexanecarboxylic acid, cyclooctanecarboxylic acid, and their derivatives.

Examples of preferable aromatic monocarboxylic acids include: aromatic monocarboxylic acids in which 1 to 3 alkoxy groups, such as alkyl groups, methoxy groups, or ethoxy groups are introduced in a benzene ring of benzoic acids such as benzoic acid and toluic acid; aromatic monocarboxylic acids with two or more benzene rings, such as biphenylcarboxylic acid, naphthalene carboxylic, and tetralin carboxylic acid, and their derivatives. Of these, benzoic acid is specifically preferred.

The molecular weight of the polyalcohol ester is net limited to, however it is preferably from 300 to 1,500, and more preferably from 350 to 750. A larger molecular weight is preferable in that the polyalcohol ester becomes difficult to volatile, while a smaller molecular weight is preferable in terms of moisture permeability, and compatibility with cellulose esters.

The carboxylic acid used for the polyalcohol ester may be a single kind or a mixture of two or more kinds. Further, all hydroxyl groups in the polyalcohol may be completely esterified or a part of them may remain as hydroxyl groups without being esterified.

Hereafter, specific examples of the polyalcohol esters are shown.

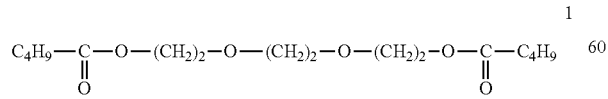

1

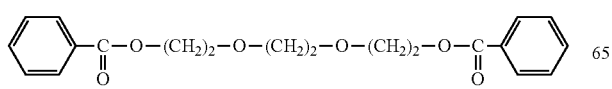

2

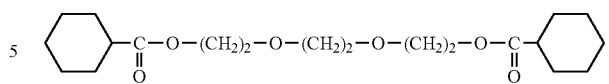

3

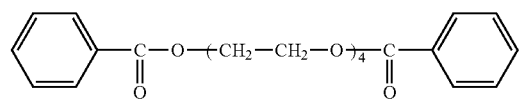

4

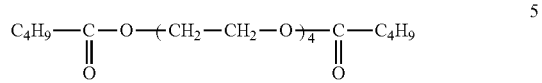

5

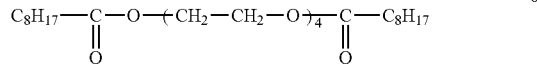

6

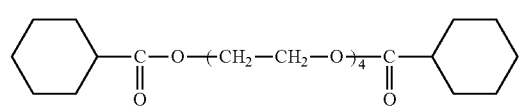

7

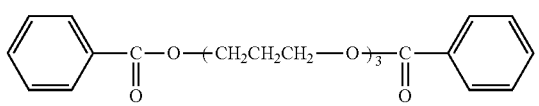

8

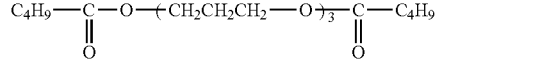

9

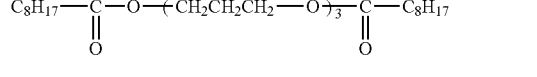

10

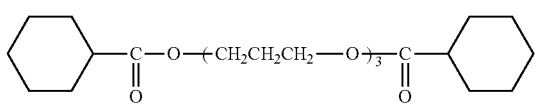

11

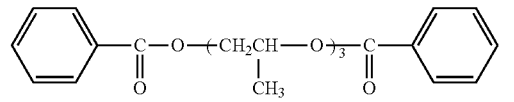

12

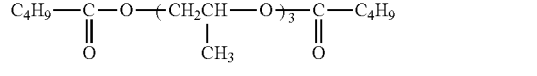

13

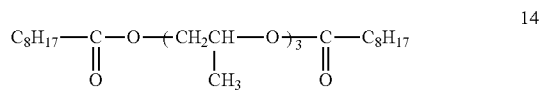

14

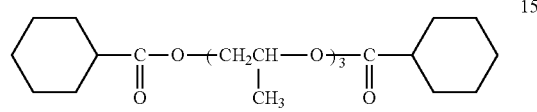

15

-continued
16
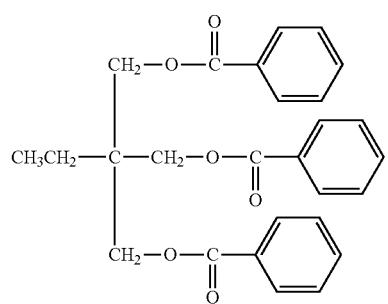
17
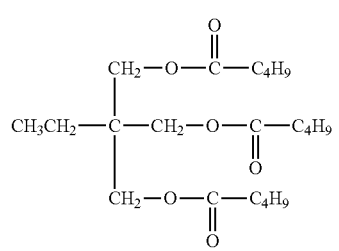
18
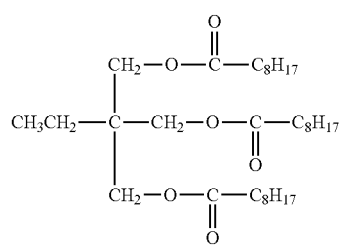
19
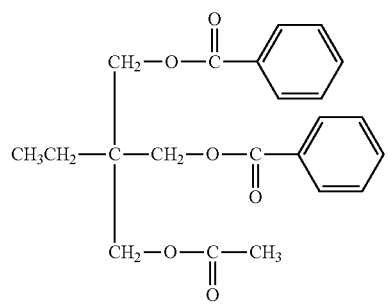
20
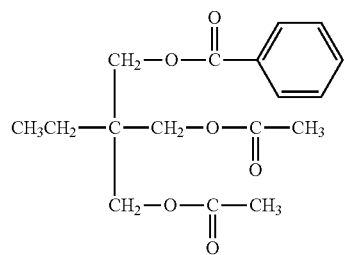
-continued
21
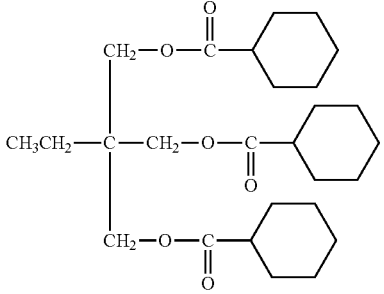
22
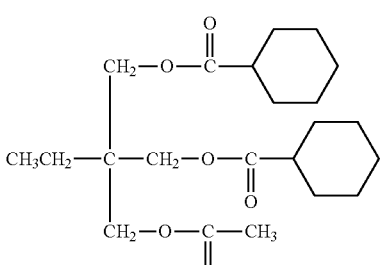
23
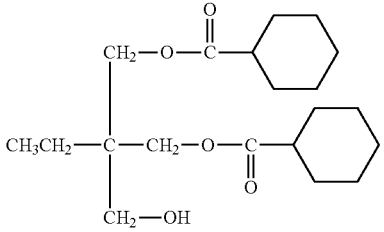
24
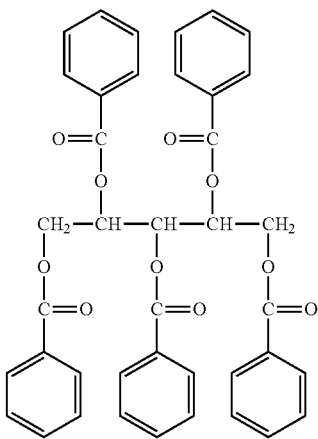

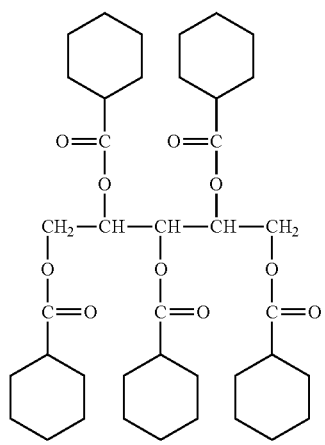
24
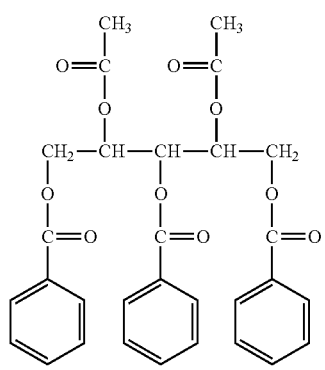
25
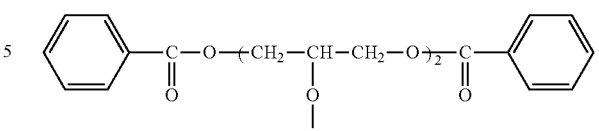
29
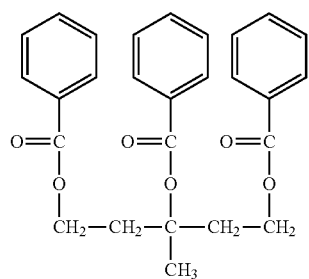
26
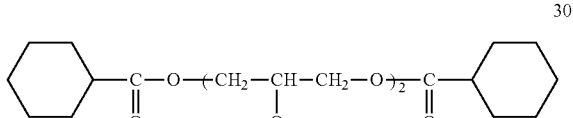
27
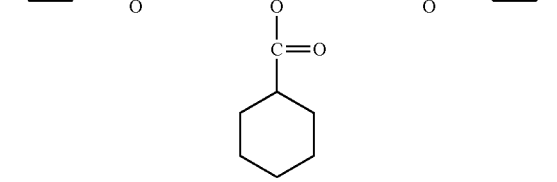
30
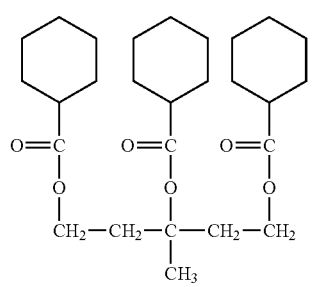
28
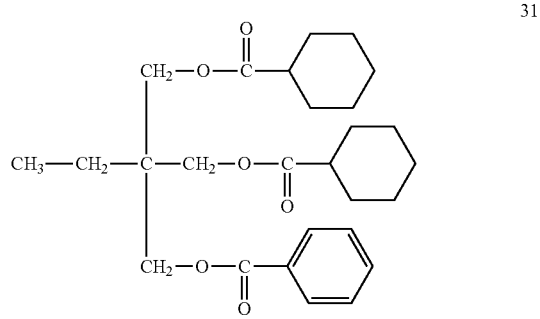
31
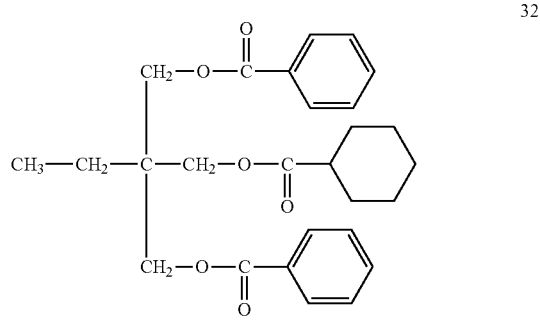
32
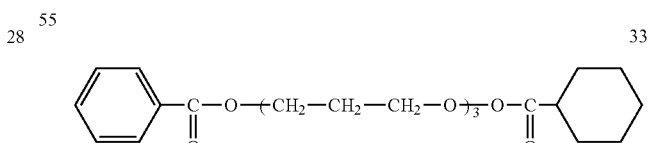
33
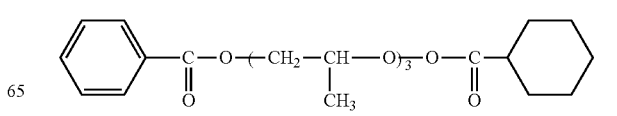
34

-continued

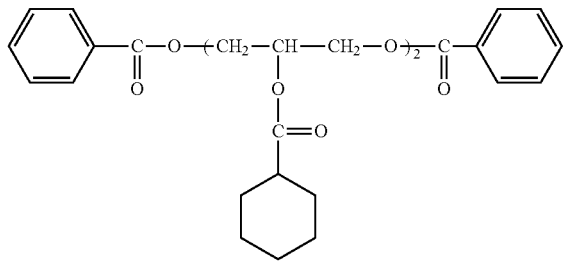

A glycolate type plasticizer is not specifically limited to, however alkylphthalylalkyl glycolates are preferably used.

Example of the alkylphthalylalkyl glycolates include: methylphthalylmethyl glycolate, ethylphthalylethyl glycolate, propylphthalylpropyl glycolate, butylphthalylbutyl glycolate, octylphthalyloctyl glycolate, methylphthalylethyl glycolate, ethylphthalylmethyl glycolate, ethylphthalylpropyl glycolate, methylphthalylbutyl glycolate, ethylphthalylbutyl glycolate, butylphthalylmethyl glycolate, butylphthlylethyl glycolate, propylphthalylbutyl glycolate, butylphthalylpropyl glycolate, methylphthalyloctyl glycolate, ethylphthalyloctyl glycolate, octylphthalylmethyl glycolate, and octylphthalylethyl glycolate.

Example of the phthalate ester type plasticizer includes: diethyl phthalate, dimethoxyethyl phthalate, dimethyl phthalate, dibutyl phthalate, di-2-ethylhexyl phthalate, dioctyl phthalate, dicyclohexyl phthalate, and dicyclohexyl terephthalate.

Example of the citric ester type plasticizer include: acetyltrimethyl citrate, acetyltriethyl citrate, and acetyltributyl citrate.

Example of the fatty acid ester type plasticizer include: butyl oleate, methylacetyl ricinoleate, and dibutyl sebacate.

Example of the phosphoric ester type plasticizer include: triphenyl phosphate, tricresyl phosphate, cresyldiphenyl phosphate, octyldiphenyl phosphate, diphenylbiphenyl phosphate, trioctyl phosphate, and tributyl phosphate.

A polycarboxylic ester compound is composed of ester of a polycarboxylic acid with a valence of 2 or more, preferably 2 to 20 and an alcohol. Further, an aliphatic polycarboxylic acid preferably has a valence of 2 to 20. In the case of an aromatic polycarboxylic acid and an acyclic polycarboxylic acid, a valence of 3 to 20 is preferable.

The polycarboxylic acid is represented by the following general formula (b).

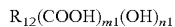

$R_{12}(COOH)_{m1}(OH)_{n1}$  General Formula (b)

(in the formula, $R_{12}$ is an (m1+n1) valent organic group; m1 is an positive integer of 2 or more; n1 is an integer of 0 or more; COOH group is a carboxyl group; and OH group is an alcoholic or phenolic hydroxyl group.)

As examples of the preferable polycarboxylic acid, although the followings are listed, the present invention is not limited thereto.

The preferable examples include: aromatic polycarboxylic acid with a valence of 3 or more, such as trimellitic acid, trimesic acid and pyromellitic acid, and their derivatives; aliphatic polycarboxylic acid, such as succinic acid, adipic acid, azelaic acid, sebasic acid, oxalic acid, fumaric acid, maleic acid and tetrahydrophthalic acid; and oxypolycarboxylic acid, such as tartaric acid, tartronic acid, malic acid and oxalic acid. It is specifically preferable to use oxypolycarboxylic acid in the point of improvement of suspending ability.

As alcohols used in a polycarboxylic ester compound usable in the present invention, well known alcohols and phenols can be used without specific limitation.

For example, straight or branched aliphatic saturated alcohols or aliphatic unsaturated alcohol with 1 to 32 carbons may be preferably used. The number of carbons is preferably 1 to 20, and particularly preferably 1 to 10.

Further, alicyclic alcohols such as cyclopentanol and cyclohexanol and their derivatives, and aromatic alcohols such as benzyl alcohol and cinnamyl alcohol and their derivatives may be also preferably used.

In the case where oxypolycarboxylic acid is used as the polyvalent carboxylic acid, alcoholic or phenolic hydroxyl groups of the oxypolycarboxylic acid may be esterified by use of monocarboxylic acid. As the preferable monocarboxylic acid, although the following may be listed, the present invention is not limited thereto.

As aliphatic monocarboxylic acids, straight chain or branched fatty acids having the number of carbons of 1 to 32 are preferably used. The number of carbons is more preferably 1 to 20, and specifically preferably 1 to 10.

Preferable examples of the aliphatic monocarboxylic acids include: saturated fatty acids such as acetic acid, propionic acid, butyric acid, valeric acid, caproic acid, enanthic acid, caprylic acid, pelargonic acid, cupric acid, 2-ethyl-hexane carboxylic acid, undecylic acid, lauric acid, tridecylic acid, myristic acid, pentadecylic acid, heptadecylic acid, stearic acid, nonadecanoic acid, arachic acid, behenic acid, lignoceric acid, cerotic acid, heptacosanoic acid, montanic acid, melissic acid and lacceric acid; and unsaturated fatty acids such as undecylenoic acid, oleic acid, sorbic acid, linoleic acid, linolenic acid and arachidic acid.

Examples of preferable alicyclic monocarboxylic acid include cyclopentane carboxylic acid, cyclohexane carboxylic acid, and cyclooctane carboxylic acid; and their derivatives.

Examples of preferable aromatic monocarboxylic acids include: aromatic monocarboxylic acids in which alkyl groups are introduced in a benzene ring of benzoic acids such as benzoic acid and toluic acid; aromatic monocarboxylic acids with two or more benzene rings, such as biphenylcarboxylic acid, naphthalene carboxylic, and tetralin carboxylic acid, and their derivatives. Of these, acetic acid, propionic acid, and benzoic acid are specifically preferred.

The molecular weight of the multivalent carboxylate ester compound is not limited to, however it is preferably in a range of 300 to 1,000, and more preferably in a range of 350 to 750. A larger molecular weight is preferable in a point of improvement of suspending properties, while a smaller molecular weight is preferable in terms of moisture permeability, and compatibility with cellulose esters.

Alcohols used for the polycarboxylic ester usable in the present invention may be a single kind or a mixture of two or more kinds.

The acid value of the polycarboxylic ester compound usable in the present invention is preferably 1 mg KOH/g or less and more preferably 0.2 mg KOH/g or less. By setting the acid value within the above range, variation of retardation due to environment is preferably suppressed.

The acid value refers to the milligram value of potassium hydroxide required to neutralize acids contained in 1 g of a sample (carboxyl groups existing in the sample). The acid value is measured in accordance with JIS K0070.

Although specifically preferable examples of the polycarboxylic cater compound will be shown below, the present invention is not limited thereto.

Examples include: triethyl citrate, tributyl citrate, acetyltriethyl citrate (ATEC), acetyltributyl citrate (ATBC), benzoyltributyl citrate, acetyltriphenyl citrate, acetyltribenzyl citrate, dibutyl tartrate, diacetyldibutyl tartrate, tributyl trimellitate, and tetrabutyl pyromellitate.

(Ultraviolet Absorbent)

The retardation film according to the present invention may also contain an ultraviolet absorbent. The ultraviolet absorbent has an object to improve durability by absorbing ultraviolet rays of not longer than 400 nm, and in particular, the transmittance for a wavelength 370 nm is preferably 10% or less, more preferably not 5% or less, and still more preferably 2% or less.

Although the ultraviolet absorbent used in the present invention is not specifically limited to, examples of the ultraviolet absorber include: an oxybenzophenone type compound, a benzotriazole type compound, a salicylic ester type compound, a benzophenone type compound, a cyano acrylate type compound, a triazine type compound, a nickel complex type compound, and inorganic powder.

Specific examples include: 5-chloro-2-(3,5-di-sec-butyl-2-hydroxylphenyl)-2H-benzotriazole, (2-2H-benzotriazole-2-yl)-6-(straight chain and branched dodecyl)-4-methylphenol, 2-hydroxy-4-benzyloxybenzophenone and 2,4-benzyloxybenzophenone, and further include: Tinuvins, such as Tinuvin 109, Tinuvin 171, Tinuvin 234, Tinuvin 326, Tinuvin 327 and Tinuvin 328, which are available commercially from BASF Japan.

Examples of the ultraviolet absorbents preferably used in the present invention include: a benzotriazole type ultraviolet absorbent, a benzophenone type ultraviolet absorbent and a triazine type ultraviolet absorbent, and specifically preferably a benzotriazole type ultraviolet absorbent, and a benzophenone type ultraviolet absorbent.

In addition to these, a disc-shaped compound such as a compound having a 1,3,5-triazine ring is preferably used.

The polarizing plate protective film according to the present invention preferably contains two or more kinds of ultraviolet absorbents.

Further, a polymer type ultraviolet absorber may also be preferably used as an ultraviolet absorbent, and polymer type ultraviolet absorbents described in JP-A 6-148430 are specifically preferably used.

As an addition method of the ultraviolet absorbent, an ultraviolet absorbent may be added into a dope after having been dissolved in an alcohol, such as methanol, ethanol and butanol; or an organic solvent such as methylene chloride, methyl acetate, acetone and dioxane; or may be directly added into a dope composition.

Those insoluble in an organic solvent, such as inorganic powder, may be added into a dope after having been dispensed in an organic solvent and cellulose ester by use of a dissolver or a sand mill.

The added amount of the ultraviolet absorbent is not uniformly determined depending on a type of the ultraviolet absorbent and a used condition, however, in the case where the dry film thickness of a polarizing plate protective film is 30 to 200 μm, it is preferably 0.5 to 10 weight %, and more preferably 0.6 to 4 weight %, to the polarizing plate protective film.

(Antioxidant)

An antioxidant is also called antidegradant. When a liquid crystal image display device etc. is placed in the state of high humidity high temperature, deterioration of a retardation film may occur. Since, for example, an antioxidant has a function which delays or prevents a retardation film from decompositioning by halogen in residual solvents in the retardation film, or by phosphoric acid of a phosphoric acid type plasticizer, etc., it is desirable to make it contain in the above-mentioned retardation film.

As such an antioxidant, a hindered-phenol type compound is used preferably. Examples of the compound include: 2,6-di-t-butyl-p-cresol, a penta ERIS retail-tetrakis[3-(3,5-di-t-butyl-4 hydroxyphenyl)propionate], triethylene glycol-bis[3-(3-t-butyl-5-methyl-4 hydroxyphenyl)propionate], 1,6-dihydroxyhexane-bis[3-(3,5-di-t-butyl-4 hydroxyphenyl)propionate], 2 and 4-bis-(n-octylthio)-6-(4-hydroxy-3,5-di-t-butyl anilino)-1,3, and 5-triazine, 2 and 2-chio-diethylenebis [3-(3,5-di-t-butyl-4 hydroxyphenyl)propionate], Octadecyl-3-(3,5-di-t-butyl-4 hydroxyphenyl)propionate, N and N'-hexamethylene bis(3,5-t-butyl-4-hydroxy-hydrocinnamide), 1, 3 and 5-trimethyl-2,4,6-tris(3,5-di-t-butyl-4-hydroxybenzyl)benzene, tris-(3,5-di-t-butyl-4-hydroxybenzyl)-isocyanurate.

In particular, preferable examples include: 2,6-di-t-butyl-p-cresol, a penta erisretil-tetrakis[3-(3,5-di-butyl-4 hydroxyphenyl)propionate], and a triethylene glycol-bis 1[3-(3-t-butyl-5-methyl-4 hydroxyphenyl)propionate]. Moreover, for example, a hydrazine type metal deactivator, such as an N and N'-bis[3-(3,5-di-t-butyl-4 hydroxyphenyl)propionyl]hydrazine, and a phosphorus type processing stabilizer, such as tris(2,4-di-butylphenyl)phosphight may be used in combination.

The added amount of these compound is preferably 1 ppm to 1.0% at a mass rate to a cellulose ester, and more preferably 10 to 1000 ppm.

(Micro Particles)

In order to improve operability, the retardation film of the present invention is preferably made to contain inorganic micro-particles such as silicon dioxide, titanium dioxide, aluminum oxide, zirconium oxide, calcium carbonate, talc, clay, burned kaolin, burned calcium silicate, hydrated calcium silicate, aluminum silicate, magnesium silicate and calcium phosphate; and micro-particles such as cross-linked polymer. Of these, silicon dioxide is specifically preferred to make haze small.

The primary average particle size of fine particles is preferably 20 nm or less, more preferably 5 to 16 nm, and specifically preferably 5 to 12 nm.

These fine particles are preferably contained in a retardation film with the formation of secondary fine particles with a panicle size of 0.1 to 5 μm, and the average particle size is preferably 0.1 to 2 μm, and preferably 0.2 to 0.6 μm. With this, convexo-concave patterns with a height of about 0.1 to 1.0 μm can be formed on a film surface, whereby suitable slipping properties can be given to the film surface.

Measurement of the primary average particle size of the fine particles used for the present invention is conducted such that 100 particles are observed with a transmission type electron microscope (magnification of 500,000 to 2,000,000 times) so as to measure the diameter of the particles and to determine the mean value of the measured diameters as a primary average particle diameter.

An apparent specific gravity of the fine particles is desirably 70 g/liter, more preferably 90 to 200 g/liter, and still more preferably 100 to 200 g/liter. When the apparent specific gravity is larger, it may become more possible to make a high-concentration dispersion liquid and it may become preferable that a haze and a coagulum may be improved. Further, in the case where a dope solution having a high solid concentration is prepared as being like the present invention, it is used especially preferably.

Silicon dioxide fine particles having a mean diameter of primary particles of 20 nm or less and an apparent specific gravity of 70 g/liter or more can be obtained such that, for example, a mixture of vaporized silicon tetrachloride and hydrogen is burn in air at 1000 to 1200° C. Further, for example, silicon dioxide fine particles are commercially available with the trade name of Aerosil 200V and Aerosil R972V (all the above, produced by Japanese Aerosil Corporation), and they can be employed in the present invention.

The apparent specific gravity of the above-mentioned description can be calculated with the following ways, a predetermined quantity of silicon dioxide fine particles is taken in a measuring cylinder, the weight of them is measured at this time, and the apparent specific gravity is calculated with the following formula.

Apparent specific gravity (g/liter)=the weight (g) of silicon dioxide fine particles/the volume (liter) of silicon dioxide fine particles The following three kinds of methods, for example, may be employed as a method of preparing dispersion solution of fine particles usable in the present invention and a method of adding it in a dope.

<<Preparing Method A>>

After stirring and mixing solvent and fine particles, the mixture is dispersed by a homogenizer. The resultant dispersion solution is made as a fine particle dispersion liquid. The fine particle dispersion liquid is added in a dope solution and is stirred.

<<Preparing Method B>>

After carrying out stirring mixing solvent and fine particles, the mixture is dispersed by a homogenizer. The resultant dispersion solution is made as a fine particle dispersion liquid. Separately, a small amount of cellulose triacetate is added in a solvent and dissolved by stirring. The resultant solution is added with the fine particle dispersion liquid and is stirred. The resultant liquid is made as a fine particle additive liquid. The fine particle additive liquid is added in a dope solution and is stirred with a line mixer.

<<Preparing Method C>>

A small amount of cellulose triacetate is added in a solvent and dissolved by stirring. The resultant solution is added with fine panicle and is dispersed by a homogenizer. The resultant liquid is made as a fine particle additive liquid. The fine particle additive liquid is added in a dope solution and is stirred with a line mixer.

Preparing method A is excellent in dispersion ability for the silicon dioxide fine particles, and Preparing method C excellent in that the silicon dioxide fine particles hardly recoagulates. Among them, Preparing method B described above is excellent in both the point of the dispersion ability for the silicon dioxide fine particles and the point that the silicon dioxide fine particles hardly recoagulates, therefore, is more preferable.

<<Dispersing Method>>

When mixing silicon dioxide fine particles with a solvent etc., the concentration of the silicon dioxide is desirably 5% by weight to 30% by weight, more desirably 10% by weight to 25% by weight, most desirably 15% by weight to 20% by weight. When the dispersion concentration is higher, liquid turbidity to added amount tends to become low and a haze and a coagulum may be improved, therefore it may be preferable.

The organic solvent used for dispersion is desirably a lower alcohol. As the lower alcohol, methanol, ethanol, propyl alcohol, isopropyl alcohol, butanol, etc. may preferably be listed. Although a solvent other than the lower alcohol is not limited especially, it is desirable to use a solvent which is used at the time of preparing a dope.

The added amount of silicon dioxide fine particles to a cellulose ester is desirably 0.01 to 5.0 parts by weight of silicon dioxide fine particles to 100 pars by weight of cellulose ester, is more desirably 0.05 to 1.0 parts by weight, and is most desirably 0.1 to 0.5 parts by weight. When the added amount is larger, it may be excellent in a dynamic friction coefficient, and when the added amount is smaller, haze is low and a coagulum becomes little.

As a homogenizer, a usual homogenizer can be used. The homogenizer is roughly divided into a media homogenizer and a medialess homogenizer. As a homogenization for silicon dioxide fine panicles, the medialess homogenizer is desirable, because of low haze. As the media homogenizer, a ball mill, a sandmill, a dieno mill, etc. are may be listed.

Although a supersonic wave type, a centrifugal type, a high-pressure type, etc. may be employed as the medialess homogenizer, a high-pressure homogenization apparatus is desirable in the present invention. The high-pressure homogenization apparatus is an apparatus to create a special condition such as a high shearing and a high-pressure state by making a composition mixed of fine particles and a solvent to pass at a high speed through a small tube.

When processing with the high-pressure homogenization apparatus, it is desirable that the maximum pressure condition in a small tube having a pipe diameter of 1 to 2000 μm in the apparatus is 9.807 MPa or more.

The maximum pressure condition is more preferably 19.613 MPa or more. At this time, an apparatus in which the highest arrival velocity reaches 100 m/sec. or more, or an apparatus in which a rate of heat transfer reaches that more than 420 kJ/hour is desirable.

Example of the high pressure dispersing apparatus includes an ultra high speed homogenizer (commercial name: Microfluidizer) manufactured by Microfluidics Corporation and Nanomizer manufactured by Nanomizer Nanomizer Co., Ltd. Other than the above, Manton-Goulin type high pressure dispersing apparatus such as a homogenizer manufactured by Izumi Food Machinery Co., Ltd, UHN-01 manufactured by Sanwa Machinery Co., Ltd., and the like are applicable.

Further, it is preferable to cast dope containing fine particles so as to come directly in contact with a casting support member, because a film with high slipping properties and low haze can be obtained.

Moreover, the above-mentioned cellulose resin film is separated after casting, is dried and wound up in a rolled form, thereafter, there may be a case where the cellulose resin film is provided with a functional thin layer, such as a hard coat layer and an antireflection layer. In order to protect a cellulose resin film as a product from a soil and waste adhesion by static electricity, the cellulose resin film is usually subjected to a package process until it is processed or shipped.

With regard to a packaging material, as far as the above-mentioned purpose can be achieved, it will not be limited especially, but the packaging material which does not prevent vaporization of remaining solvent from the film is desirable. Concretely, polyethylene, polyester, polypropylene, nylon, polystyrene, paper, various nonwoven fabrics, etc. are listed as the packaging material. A packaging material in which fiber became mesh cross state is used more preferably.

<Method for Producing an Optical Film>

Next, description will be given with regard to method for producing an optical film of the present invention, in particular, to a retardation film.

Even if the retardation film of the present invention are films produced by melt casting method or films produced by solution casting method, these films can be used preferably.

The manufacture of the retardation film of the present invention is conducted by a process of dissolving cellulose ester and additives in a solvent so as to prepare a dope; a process of casting the dope on an endless metal support member which shifts endlessly; a process of drying the cast dope as a web, a process of peeling the web from the metal support member, a process of stretching or holding the width, a process of drying the web further, and a process of winding up the finish film.

A process of preparing a dope is further stated, that is, a higher content or concentration of cellulose resin in the dope is preferable since the load of the drying process following the flow-casting process on a metal support is reduced, however, if the concentration or cellulose resin is too high, the load of the filtration becomes larger and filtration accuracy becomes worse. Preferable content of cellulose resin to satisfy the both is from 10 to 35 percent by weight and more preferably from 15 to 25 percent by weight.

A solvent used in the dope of the present invention may be used alone, however, two or more solvents may also be used together. A mixture of a good solvent for cellulose resin and a poor solvent is more preferably used to increase manufacturing efficiency. A mixed solvent being rich in a good solvent is preferable to increase solubility of the cellulose resin.

The preferable mixing ratio is from 70 to 98 percent by weight of a good solvent, and from 2 to 30 percent of a poor solvent. Herein, the good solvent is defined as being capable of dissolving cellulose resin with a single use, and a poor solvent as swelling or being incapable of dissolving cellulose ester with a single use.

Sometimes, a solvent works as a good solvent of a cellulose ester, and sometimes as a poor solvent depending on the acetification degree (degree of acetyl substitution) of the cellulose ester.

Good solvents used in the present invention include, for example: organic halides (such as methylene chloride), dioxolanes, acetone, methyl acetate and methyl acetoacetate, however, the present invention is not specifically limited thereto. Of these, methylene chloride and methyl acetate are specifically preferable.

Poor solvents used in the present invention include, for example: methanol, ethanol, n-butanol, cyclohexane, and cyclohexanone, however, the present invention is not specifically limited thereto. A dope may preferably contain from 0.01 to 2 percent by weight of water.

Further, as a solvent utilized for dissolution of cellulose ester, a solvent removed from film by drying in a film casting process is recovered and reused.

In a recovered solvent, a trace amount of additives such as a plasticizer, an ultraviolet absorbent, polymer or monomer components added in cellulose ester may be contained, however, the solvent may be utilized even containing them or may be utilized appropriately after purification.

In the process of preparing a dope, a cellulose ester is dissolved in a mixture of solvents using a common method. By combining heating and pressing, the can be heated to a boiling point or more under normal pressure.

Formation of a gel or an insoluble agglomerate (known as "Mamako" in Japanese which represents insoluble residue when powder is dissolved in a solvent) may be avoided when the dissolving temperatures is higher than the ambient pressure boiling point of the mixed solvents, and simultaneously the temperature is in the range where the mixed solvents do not boil under the applied higher pressure.

The following dissolving method is also preferable, in which a cellulose ester is swollen in a mixture of good and poor solvents followed by adding good solvents to dissolve the swollen cellulose ester.

Pressure may be applied by injecting an inert gas such as nitrogen or by increasing the vapor pressure of the solvents by heating. Heating is preferably carried out from the outside of the container. A jacket type heater is preferable because the temperature is easily controlled.

A higher dissolving temperature is preferable with respect to the solubility of the cellulose ester, however, too high a temperature may lower the productivity because the pressure also becomes too high.

The dissolving temperature is preferably from 45 to 120° C., more preferably from 60 to 110° C. and still more preferably from 70 to 105° C. The pressure should be controlled not to allow boiling at the set temperature.

A cooling dissolution method is also preferably utilized, by which cellulose ester is successfully dissolved in solvents such as methyl acetate.

In the next step, the cellulose ester solution thus prepared is filtered using an appropriate filter material. A filter material with a smaller absolute filtration accuracy is more preferable for removing impurities, however, too small a filtration accuracy easily causes clogging up of the filter.

The absolute filtration accuracy of the filter is preferably not larger than 0.008 mm, more preferably from 0.001 to 0.008 mm and still more preferably from 0.003 to 0.006 mm.

The filter material used in the present invention is not specifically limited, and plastic filters (such polypropylene and Teflon®) as well as metal (alloy) filters (such as stainless steel) are preferable, since these materials are free from peeling of a fiber, which may occur when fibrous material is used.

Impurities and, particularly, luminescent foreign materials contained in the cellulose ester are preferably diminished or entirely removed by filtering.

"Luminescent foreign materials" denote impurities which are observed as bright spots when a cellulose ester film is placed between two polarizing plates arranged in a crossed Nicol state, illuminated with a light from one side and observed from the other. The number of luminescent foreign materials of larger than 0.01 mm in diameter is preferably less than 200 per $cm^2$.

More preferably is less than 100 per $cm^2$, still more preferably is less than 50 per $cm^2$, and still more preferably is from 0 to 10 per $cm^2$. The smaller number of luminescent foreign materials of less than 0.01 mm in diameter is preferably.

The dope may be filtered by any common methods. A preferable method is to filter the dope at temperatures which is higher than the boiling point of the mixed solvents under the ambient pressure and in a range in which the solvent does not boil under an increased pressure, because a difference in filtering pressure (referred to as a pressure difference) between before and after filtering becomes small.

The filtering temperature is preferably from 45 to 120° C., more preferably from 45 to 70° C. and still more preferably from 45 to 55° C.

The smaller filtering pressure is preferable, and the filming pressure is preferably 1.6 MPa or less, more preferably 1.2 MPa or less, and still more preferably 1.0 MPa or less.

Description will be given about casting of a dope.

A metal support used in the flow-casting (cast) process is preferably polished to a mirror finished surface. As the metal support, a stainless steel belt or a cast metal drum with a surface finished with plating is preferably used.

The casting width is preferably from 1 to 4 m. The surface temperature of the metal support in the casting process is from −50° C. to a temperature just below the boiling point of the solvent. A higher temperature is preferable because the drying speed of web can be made faster, however, if the temperature is too high, the web may cause foaming, and the flatness of the web deteriorates.

The temperature of the support is preferably 0 to 55° C., and more preferably 25 to 50° C., Another preferable method is that a web is gelated by cooling the drum, and peeled off from the drum while containing much solvent.

Although the method to control the temperature of the support is not specifically limited to, a method of blowing warm or cool air onto the support or a method of applying warm water on the rear side of the support is acceptable. The warm water method is more preferable because the temperature of the metal support becomes stable in a shorter time due to more efficient thermal conduction. In the case when warm air is used, an air temperature higher than the desired temperature is sometimes used.

In order to obtain a retardation film with a sufficient flatness, the residual solvent content of the web when being peeled from a metal support is preferably 10 to 150% by weight, more preferably 20 to 40% by weight or 60 to 130% by weight, and specifically preferably 20 to 30% by weight or 70 to 120% by weight.

In the present invention, the residual solvent content of the web is defined by the following formula:

Residual solvent content (% by weight)=$\{(M-N)/N\} \times 100$ were M represents the weight of a sample of the web collected in the manufacturing process or after manufacturing, and N represents the weight of the same sample after it was dried at 115° C. for 1 hour.

In the drying process of the retardation film, the web is peeled from the support and further dried until the residual solvent decreases 1 weight % or less, more preferably 0.1 weight % or less, specifically preferably 0 to 0.01 weight %.

In the film drying process, usually a roll drying method in which a cellulose ester film is passed through many rollers placed alternatively up and down in a staggered manner or a drying process to dry while conveying a film with a tenter method may be employed.

In order to produce the retardation film of the present invention, the stretching of a web in the width direction (transverse direction) with a tenter technique which grips the both ends of the web with a clip etc. is specifically desirable. The web is preferably peeled with a tension of 300 N/m or less.

The method to dry the web is not specifically limited to, however generally, hot air, IR ray, heated rollers or microwave irradiation is used. Hot air is preferably used with respect to ease of cure and low cost.

The preferable drying temperature of a web is from 40 to 200° C. and is preferably increased stepwise.

Although the thickness of the retardation film is not specifically limited to, it is 10 to 200 μm, more preferably 10 to 100 μm, and still more preferably 20 to 60 μm.

The width of the retardation film relating to the present invention is 1 to 4 m, more preferably 1.4 to 4 m, and specifically preferably 1.6 to 3 m. The retardation with a width larger than 4 m becomes difficult to convey.

As the preferable retardation in the point of enlarging a viewing angle in a liquid crystal display device of VA type (MVA, PVA), the retardation film of the present invention has a retardation value Ro, defined by the following formula (i), of 30 to 90 nm and a retardation value Rt, defied by the following formula (ii), of 70 to 300 nm.

$$Ro=(nx-ny) \times d \qquad \text{Formula (i)}$$

$$Rth=\{(nx+ny)/2-nz\} \times d \qquad \text{Formula (ii)}$$

(In the formulas, nx represents a refractive index in a film in-plane slow axis direction; ny represents a refractive index in a film in-plane fast axis direction, and nz represents a refractive index in a film thickness direction; and d represents a thickness (nm) of the film.)

In this connection, the retardation values Ro and Rth can be measured by use of an automatic double refractive-index meter. For example, the retardation values can be measured by use of KOBRA-21ADH (manufactured by Oji Scientific Instrument Co., Ltd.) under the environment of a temperature of 23° C., a humidity of 55% RH with a wavelength of 589 nm.

In order to obtain the target retardation values Ro and Rth of the present invention, the retardation film has the constitution of the present invention, and further is subjected to the conveyance tension control and the refractive index control by a stretching operation.

For example, by reducing or increasing the tension in the longitudinal direction, it becomes possible to vary the retardation value.

Further, in the longitudinal direction of film (film producing direction) and in the direction perpendicular thereto, that is, in the width direction, it is possible to perform sequentially or simultaneously biaxial stretching or uniaxial stretching.

The stretching magnifications in the biaxial directions perpendicular to each other are preferably set to finally 0.8 to 1.5 times in the casting direction and 1.1 to 2.5 times in the width direction, and more preferably set to 0.8 to 1.0 times in the casting direction and 1.2 to 2.0 times in the width direction.

The stretching temperature is preferably 120° C. to 200° C., more preferably 150° C. to 200° C., still more preferably higher than 150° C. and not higher than 190° C.

It may be preferable to stretch a film under the condition where the content of the residual solvent in the film is 20 to 0%, more preferably 15 to 0%.

More concretely, the film is preferably stretched under the condition that the content of the residual solvent is 11% at 155° C., or the content of the residual solvent is 2% at 155° C. Otherwise, the content of the residual solvent is 11% at 160° C., or the content of the residual solvent is not higher than 1% at 160° C.

A method to stretch a web is not specifically limited. Examples of the method include: a method to stretch in the longitudinal direction by making a circumferential speed difference among plural rolls and utilizing the roll circumferential speed difference among them, a method to stretch in the longitudinal direction by fixing the both edge of a web with clips or pins and widening the intervals between clips and pins toward the proceeding direction, a method to stretch by widening similarly along the width direction, and a method to stretch in the both of longitudinal and width directions by simultaneously widening along the longitudinal and width directions. Of cause, these methods can be employed in combination.

In a so-called tenter method, it is preferable that a smooth stretching can be performed by driving the clip portion by a linear drive method which reduces risk to such as breakage.

It is preferable to perform the width holding or stretching in the width direction by a tenter, which may be either a pin tenter or a clip tenter.

The slow axis or the fast axis of optical compensation film of the present invention preferably is present in a film plane, and with the assumption that an angle formed with a film producing direction is θ1, θ1 is preferably −1° or more and +1° or less, and more preferably −0.5° or more and +0.5° or less.

This θ1 can be defined as an orientation angle, and measurement of θ1 can be performed by use of automatic double refractometer KOBRA-21ADH (Oji Scientific Instruments Co., Ltd.). The θ1 which satisfies the above relationships can contributes to obtain a high luminance and to restrain or prevent light leak, and to obtain faithful color reproduction in a color liquid display.

(Physical Properties of the Optical Film)

The moisture permeability of the optical film relating to the present invention is preferably 300 to 1,800 g/m²·24 h, more preferably 400 to 1,500 g/m²·24 h and specifically preferably 40 to 1,300 g/m²·24 h at 40° C., 90% RH. The moisture permeability can be measured in accordance with the method described in JIS Z 0208.

The future elongation of the optical film relating to the present invention is preferably 10 to 80%, and more preferably 20 to 50%.

The visible light transmittance of the optical film relating to the present invention is preferably 90% or more, and more preferably 93% or more.

The haze of the retardation film relating to the present invention is preferably less than 1% and specifically preferably 0 to 0.1%.

(Polarizing Plate)

The optical film of the present invention can be used for a polarizing plate and a liquid crystal display device employing the same.

The polarizing plate of the present invention is characterized by being a polarizing plate in which the retardation film of the present invention is pasted on at least one surface of a polarizer. The liquid crystal display device of the present invention is characterized in that the polarizing plate according to the present invention is pasted up on at least one liquid crystal cell surface via an adhesive layer.

The polarizing plate of the present invention can be prepared ordinary method. It may be preferable to apply alkaline saponification treatment to the polarizer side surface of the retardation film of the present invention, and to past the retardation film on at least one surface of a polarizer produced by being dipped in an iodine solution and stretched by use of a complete saponification type polyvinyl alcohol aqueous solution.

On the other surface, the above retardation film may be pasted or other film may be pasted.

Examples of the other films include commercially-available cellulose ester films (for example, Konica Minolta TAC KC8UX, KC5UX, KC8UCR3, KC8UCR4, KC8UCR5, KC8UY, KC4UY, KC4UE, KC8UE, KC8UY-HA, KC8UX-RHA, KC8UXW-RHA-C, KC8UXW-RHA-NC, and KC4UXW-RHA-NC, manufactured by Konica Minolta Opto Inc.)

The polarizing plate used for the surface side of a display device may preferably include an antireflection layer, an antistatic layer, an antifouling layer, and a back coat layer besides an antiglare layer or a clear hard coat layer.

A polarizer as a primary constitution element is an element to pass only light of a polarized wave plane of a predetermined direction, and a typical polarizer known at present is a polyvinyl alcohol type polarizing film, examples of which include a polyvinyl alcohol film dyed with iodine and a polyvinyl alcohol film dyed with dichroic dye.

The commonly-used polarizer is produced in such a way that a polyvinyl alcohol aqueous solution is cast to form a film, and the cast film is uniaxially stretched and dyed, or is dyed and uniaxially stretched, preferably followed by being subjected to durability treatment with a boron compound. The layer thickness of the polarizer is preferably 5 to 30 μm and specifically preferably 10 to 20 μm.

Further, ethylene modified polyvinyl alcohol which is described in Japanese Unexamined Patent Publication Nos. 2003-248123 and 2003-342322 and has an ethylene unit content of 1 to 4 mol %, a degree of polymerization of 2,000 to 4,000 and a degree of saponification of 99.0 to 99.99 mol %, is also preferably used.

Of these, ethylene modified polyvinyl alcohol having a hot water breaking temperature of 66 to 73° C. is preferably used.

A polarizer employing this ethylene modified polyvinyl alcohol film is excellent in polarizing ability and durability, and in addition, exhibits few color spots. Accordingly, it is specifically preferably used in a large size liquid crystal display device.

Examples of the adhesive employed at the time of pasting include a PVA type adhesive and an urethane type adhesive. Among them, the PVA type adhesive is preferably used.

<Liquid Crystal Display Device>

By using the polarizing plate of the present invention for a liquid crystal display device, various kinds of the liquid crystal display devices of the present invention excellent in visibility can be produced.

The retardation film of the present invention can be used for liquid crystal display devices with various drive systems, such as STN, TN, OCB, HAN, VA (MVA, PVA), VA-IPS, TBA, IPS, and OCB.

Further, it is preferably used for vertically-oriented liquid crystal display devices such as VA (MVA, PVA), VA-IPS, and TBA types.

In particular, even if a liquid crystal display device has a large screen more than 30 inch type, it is possible to obtain a liquid crystal display device which has few environmental variations and reduced light leakages and excellent in visibility, such as color tone unevenness and front contrast.

EXAMPLE

Although the present invention is concretely explained hereafter with reference to examples, the present invention is not limited to these examples.

Example 1

Production of a Retardation Film 101

<Particulate Dispersion Liquid 1>

| | |
|---|---|
| Particulate (Aerosil R812 manufactured by Japan Aerosil) | 11 parts by weight |
| Ethanol | 89 parts by weight |

The above materials were agitated and mixed by a dissolver for 50 minutes and then dispersed by the use of Manton Gaulin.

<Particulate Additive Liquid>

The particulate dispersion liquid was added slowly into a dissolving tank storing methylene chloride while sufficiently agitating. Further, the solution was dispersed by Attritor such that the particle size of secondary particles became a predetermined size. The resultant solution was filtered by the use of Fine Met NF manufactured by Nippon Seisen Co., Ltd., whereby particle additive liquid was prepared.

| | |
|---|---|
| Methylene chloride | 99 parts by weight |
| Particle dispersion liquid 1 | 5 parts by weight |

A main dope solution with the following compositions was prepared. First, methylene chloride and ethanol were added into a pressure solution tank. The cellulose ester with a degree of substitution of acetyl group being 2.00 was supplied into the pressure solution tank storing the solvent while being agitated. Further, it was dissolved completely while being heated and agitated. The resultant liquid was filtered by the use of Azumi filter paper No. 244 manufactured by Azumi Filter Paper Co., Ltd., whereby the main dope solution was prepared.

<Composition of the Main Dope>

| | |
|---|---|
| Methylene chloride | 340 parts by weight |
| Ethanol | 64 parts by weight |
| Cellulose ester (a degree of substitution of acetyl group being 2.00) | 100 parts by weight |
| Sugar ester compound 1 | 12 parts by weight |
| Particle additive liquid | 1 part by weight |

The above materials were put into an enclosed main dissolving tank 1, followed by dissolved while being agitated, thereby preparing a dope solution.

The solvent was evaporated until the amount of residual solvent in a film cast (cast) on a stainless steel belt support became 75%, and subsequently the film was peeled off from the stainless steel belt support with a peeling tension of 130 N/m. The peeled retardation film was stretched by 20% in the width direction by use of a tentar while being applied with heat of 170° C. The residual solvent at the time of starting of the stretching was 15%.

Subsequently, the drying of film was completed while conveying the film in a dry zone with many rolls. The drying temperature was 130° C. and the conveying tension was made to 100 N/m. In the above ways, the retardation film 101 with a dried film thickness of 40 μm was obtained as mentioned above.

<Production of Retardation Films 102 to 126>

The retardation films 102 to 126 were produced by changing materials shown in Tables 2 and 3 and production conditions such as stretching rate and temperature shown in Table 4 so as to obtain desired retardation.

TABLE 2

| Cellulose ester No. | Degree of substitution of acyl groups | |
|---|---|---|
| | ac | pr |
| 1 | 2.00 | — |
| 2 | 2.20 | — |
| 3 | 2.40 | — |
| 4 | 2.45 | — |
| 5 | 2.55 | — |
| 6 | 2.60 | — |
| 7 | 2.89 | — |
| 8 | 1.90 | — |
| 9 | 1.50 | 0.90 |

TABLE 3

| Sugar ester compound | Kind of an acyl group | Average degree of substitution | Mass % of compounds with a degree of substitution of 4 or less |
|---|---|---|---|
| 1 | Benzoyl | 5.2 | 40 |
| 2 | Benzoyl | 6.0 | 30 |
| 3 | Benzoyl | 5.5 | 35 |
| 4 | Benzoyl | 4.7 | 60 |
| 5 | Benzoyl | 4.0 | 70 |
| 6 | Benzoyl | 6.0 | 20 |
| 7 | Benzoyl | 6.5 | 10 |
| 8 | Benzoyl | 3.0 | 80 |
| 9 | Benzoyl | 2.5 | 99 |
| 10 | Acetyl | 6.0 | 30 |
| 11 | Acetyl | 5.5 | 40 |
| 12 | p-methyl benzoy | 6.0 | 30 |
| 13 | Benzoyl carbonyl | 6.0 | 30 |
| 14 | Isobutanoyl | 6.0 | 30 |

<Production of the Retardation Film 127>

The following two kinds of dopes were produced, and a laminated retardation film 127 having core and skin portions was produced by co-casting.

(Preparation of a Cellulose Ester Dope for a Core Layer)

| | |
|---|---|
| Cellulose ester (a degree of substitution of acetyl group: 2.45) | 100 parts by weight |
| Triphenyl phosphate | 20 parts by weight |
| Retardation exhibiting agent X shown below | 4 parts by weight |
| Peeling advancing agent shown below | 0.03 parts by weight |
| Dichloromethane | 406 parts by weight |
| Methanol | 61 parts by weight |

(Preparation of a Cellulose Ester Dope for a Skin Layer)

| | |
|---|---|
| Cellulose ester (a degree of substitution of acetyl group; 2.89) | 100 parts by weight |
| Triphenyl phosphate | 12 parts by weight |
| Retardation exhibiting agent X shown below | 4 parts by weight |
| Peel-off advancing agent shown below | 0.03 parts by weight |
| Dichloromethane | 406 parts by weight |
| Methanol | 61 parts by weight |

Retardation exhibiting agent X

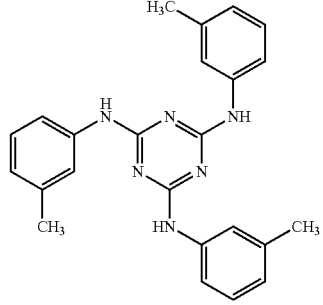 [SMILES: Cc1cccc(Nc2nc(Nc3cccc(C)c3)nc(Nc3cccc(C)c3)n2)c1]

Peel-off advancing agent

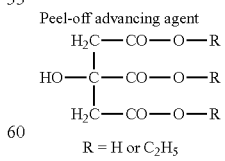

R = H or $C_2H_5$

The above materials were put in respective mixing tanks and dissolved by being agitated, and then the resulting solutions were filtered through a filter paper with an average pore size of 34 μm and a sintered metal filter with an average port size of 10 μm, thereby preparing respective cellulose ester dopes. These dopes were subjected to co-casting with a band casting machine so as to form a tree layer constitution of skin layer/core layer/skin layer. The casting amount of each dope was adjusted so as to make the core layer the thickest. As a result, a simultaneous multi layer casting was performed such that the thickness of the stretched film became 40 μm. When the amount of residual solvent was about 30 mass %, a film was peeled off from the band, and the peeled film was stretched in the width direction by a stretching rate of 32% with a tenter while being sprayed with heat wind. Thereafter, the stretched film was relaxed for 60 seconds at 140° C. such that the stretching rate became 30%. Subsequently, the film was transferred from tenter conveyance to roll conveyance, further dried at a temperature of 120 to 150° C., and wound up.

<<Evaluation>>

For each of the obtained retardation films, minute light leakage and retardation value before and after a wet-heat durability test were measured by the following procedures. Further, the inner haze difference before and after the wet-heat durability test was measured. Herein, measurement and evaluation were performed under the atmosphere of 23° C. and 55% RH, unless otherwise specified. The results are shown in Table 4.

<Measurement of Minute Light Leakage>

In a measurement apparatus in which a sample with 100 square μm (subjected to moisture control under the environment of 23° C. and 55±3% RH for 24 hours), a halogen light source, a band pass filter (center wavelength of 550 nm and half band width of 80 nm), an upper polarizing plate, a wavelength plate with a rotating mechanism, a retardation film, an objective lens with a magnification of 20 times, a rotation type wavelength plate, a lower polarizing plate, and a CCD camera (4 million pixels) are arranged in this order, a light amount change was measured while rotating two wavelength plates by use of a light source with an average wavelength of 550 nm, as Muller matrix for each pixel was calculated from the light amount change, and Ro, Φ, and X were calculated from the values.

This measurement was repeated at an equal interval in the widthwise direction of the film so as to obtain a value of X for each of ten points, the average value of them was set to Xa, and then the resulting value of Xa was evaluated in accordance with the following criterion.

The size of each pixel was 0.33 μm and the number of measurement data in position measurement was 91,809 points.

$$\Delta\phi = |\phi - (\sum \phi)/N|$$

$$X = \left(\sum \sin^2 2\Delta\phi \times \sin^2 \frac{\pi Ro}{\lambda}\right)/N$$

AA: less than $1.5 \times 10^{-7}$
A: $1.5 \times 10^{-7}$ or more and less than $2.0 \times 10^{-7}$
B: $2.0 \times 10^{-7}$ or more and less than $2.5 \times 10^{-7}$
C: $2.5 \times 10^{-7}$ or more <Measurement of Retardation Values Ro, Rth Before and Behind a Wet-Heat Durability Test>
(Saponification Treatment)

Each of the produced retardation films was immersed in a 2 mol/L potassium hydroxide solution at 40° C. for 30 seconds, successively washed with water, dried at 60° C. dry in an oven for 5 minutes, and then subjected to the measurement of retardation values by the following procedure. The measured retardation values were made to the initial values.

A sample film with a size of 35 mm×35 mm was cut out from each of the obtained retardation films, and subjected to humidity control at 25° C. and 55% RH for 2 hours. Each sample film was subjected to measurement by an automatic double refractive-index meter (KOBRAWR, manufactured by Oji Scientific Instrument Co., Ltd.) so as to obtain measurement values by measuring the sample film from a vertical direction at 589 nm and similarly by measuring die sample film while inclining the sample film. Then, the retardation values were calculated based on extrapolation values of the measurement values by the following formulas.

$$Ro=(nx-ny)\times d \qquad \text{Formula (i)}$$

$$Rt=\{(nx-ny)/2-nz\}\times d \qquad \text{Formula (ii)}$$

(In the formulas, nx represents a refractive index in a film in-plane slow axis direction; ny represents a refractive index in a film in-plane fast axis direction, and nz represents a refractive index in a film thickness direction; and d represents a thickness (nm) of the film.)

In this connection, the retardation values Ro and Rth were measured by use of KOBRA-21ADH (manufactured by Oji Scientific Instrument Co., Ltd.) under the environment of a temperature of 23° C., a humidity of 55% RH with a wavelength of 589 nm.

(Wet-Heat Durability Test Processing)

Each of the above retardation films having been subjected to the saponification treatment was put into a constant temperature reservoir set to 60° C. and 90% RH, taken out from the constant temperature reservoir 300 hours after, and then, subjected to the measurement of retardation values Ro and Rth similarly to the measurement of the initial values, thereby calculating a change ratio before and after the wet-heat durability test.

(Change Ratio of Retardation Values)
AA: 0 to 1%
A: 2 to 3%
C: 4% or more

<Inner Haze Difference Before and after the Wet-Heat Durability Test>
(Saponification Treatment Condition 1)

Each of the produced retardation films was immersed in a 2 mol/L potassium hydroxide solution at 40° C. for 30 seconds, successively washed with water, dried at 60° C. dry in an oven for 5 minutes, and then subjected to the measurement of inner haze by the following procedure. The measured values of inner have were made to the initial values.

(Inner Haze)

Each of the produced retardation films was subjected the measurement of inner haze by the above-mentioned procedures.

(Wet-Heat Durability Test Processing)

After the above saponification treatment, each of the retardation films was put into a constant temperature reservoir set to 60° C. and 90% RH, taken out from the constant temperature reservoir 300 hours after, and then, subjected to the measurement of inner haze similarly to the measurement of the initial values, thereby calculating a change ratio of them.

As evaluation, a difference before and behind the wet-heat durability test was evaluated based on criterion shown below.

(Inner Haze Variation Amount)
AA: 0.00 to 0.01
A: 0.02 to 0.03
C: 0.04 or more

TABLE 4

| Sample No. | Cellulose ester | Sugar ester | Film thickness (μm) | Stretching temperature (°C.) | Stretching rate (%) | Retardation (nm) Ro | Rth | Xa | Before and after a moisture-heat durability test Change ratio Ro | Rth | Inner haze difference | Remarks |
|---|---|---|---|---|---|---|---|---|---|---|---|---|
| 101 | 1 | 1 | 40 | 170 | 20 | 52 | 125 | A | A | AA | AA | Inventive |
| 102 | 1 | 2 | 40 | 170 | 20 | 52 | 125 | B | A | A | A | Inventive |
| 103 | 1 | 3 | 40 | 170 | 20 | 52 | 125 | A | A | A | AA | Inventive |
| 104 | 1 | 7 | 40 | 170 | 20 | 52 | 125 | C | C | C | C | Comparative |
| 105 | 4 | 1 | 60 | 140 | 23 | 70 | 220 | AA | A | AA | AA | Inventive |
| 106 | 4 | 1 | 80 | 120 | 23 | 70 | 330 | A | A | A | AA | Inventive |
| 107 | 4 | 1 | 40 | 160 | 36 | 52 | 125 | AA | AA | AA | AA | Inventive |
| 108 | 4 | 2 | 40 | 160 | 36 | 52 | 125 | B | A | A | A | Inventive |
| 109 | 4 | 3 | 40 | 160 | 36 | 52 | 125 | A | A | A | AA | Inventive |
| 110 | 4 | 4 | 40 | 160 | 36 | 52 | 125 | A | A | A | AA | Inventive |
| 111 | 4 | 5 | 40 | 160 | 36 | 52 | 125 | A | A | A | A | Inventive |
| 112 | 4 | 6 | 40 | 160 | 36 | 52 | 125 | C | A | A | C | Comparative |
| 113 | 4 | 7 | 40 | 160 | 36 | 52 | 125 | C | C | C | C | Comparative |
| 114 | 4 | 8 | 40 | 160 | 36 | 52 | 125 | B | A | A | A | Inventive |
| 115 | 4 | 9 | 40 | 160 | 36 | 52 | 125 | C | C | C | C | Comparative |
| 116 | 2 | 1 | 40 | 165 | 30 | 52 | 125 | AA | A | AA | AA | Inventive |
| 117 | 2 | 2 | 40 | 165 | 30 | 52 | 125 | B | A | A | A | Inventive |
| 118 | 2 | 4 | 40 | 165 | 30 | 52 | 125 | A | A | A | AA | Inventive |
| 119 | 2 | 6 | 40 | 165 | 30 | 52 | 125 | C | A | A | C | Comparative |
| 120 | 2 | 9 | 40 | 165 | 30 | 52 | 125 | C | C | C | C | Comparative |
| 121 | 5 | 1 | 40 | 158 | 40 | 52 | 125 | AA | AA | AA | AA | Inventive |
| 122 | 5 | 4 | 40 | 158 | 40 | 52 | 125 | AA | A | AA | AA | Inventive |
| 123 | 6 | 1 | 40 | 153 | 30 | 52 | 125 | A | A | A | A | Inventive |
| 124 | 7 | 1 | 40 | 160 | 30 | 52 | 125 | A | A | A | A | Inventive |
| 125 | 8 | 1 | 40 | 175 | 30 | 52 | 125 | A | A | A | A | Inventive |
| 126 | 9 | 1 | 40 | 160 | 30 | 52 | 125 | A | A | A | A | Inventive |
| 127 | 7/4/7 | — | 40 | 160 | 30 | 52 | 125 | C | C | C | C | Comparative |

As can be understood from the above table, since the retardation film of the present invention has desirable minute light leakage and retardation value as retardation film, small retardation change ratio before and after the wet-heat durability test, and also small inner haze difference before and after the wet-heat durability test, it is a retardation film with excellent wet-heat durability.

Example 2

Production of Retardation Films 201 and 205

A film produced similarly to the retardation film 101 in Example 1 was immersed in a 4 mol/L potassium hydroxide solution at 50° C. for 90 seconds, successively washed with water, and dried at 60° C. dry in an oven for 5 minutes, thereby obtaining a retardation film having been subjected to the saponification treatment (saponification treatment condition 2). This film was made a retardation film 201.

Subsequently, a film produced similarly to the retardation film 101 in Example 1 was immersed in a 1.5 mol/L potassium hydroxide solution at 30° C. for 30 seconds, successively washed with water, and dried at 60° C. dry in an oven for 5 minutes, thereby obtaining a retardation film having been subjected to the saponification treatment (saponification treatment condition 3). This film was made a retardation film 201. This film was made a retardation film 205.

<Production of Retardation Films 202 to 204 and 206 to 211>

The retardation films 202 to 204 and 206 to 211 each treated on the above saponification conditions were produced in the same way as those of the retardation films 201 and 205 except that cellulose esters described in Table 5 were used.

<<Evaluation>>

For each of the obtained retardation films, minute light leakage, retardation values Ro and Rth before and after the wet-heat durability test, and the inner haze difference before and after the wet-heat durability test were measured in the same way as those in Example 1 except that the saponification treatment conducted in Example 1 was not conducted. The measurement results are shown in Table 5.

TABLE 5

| Sample No. | Cellulose ester | Sugar ester | Stretching temperature (°C.) | Stretching rate (%) | Condition of saponification treatment | Retardation (nm) Ro | Rth | Xa | Before and after a moisture-heat durability test Change ratio Ro | Rth | Inner haze difference | Remarks |
|---|---|---|---|---|---|---|---|---|---|---|---|---|
| 201 | 1 | 1 | 170 | 25 | 2 | 52 | 125 | A | A | A | A | Inventive |
| 202 | 2 | 1 | 160 | 25 | 2 | 52 | 125 | A | A | A | A | Inventive |
| 203 | 4 | 1 | 170 | 25 | 2 | 52 | 125 | AA | AA | AA | AA | Inventive |
| 204 | 5 | 1 | 170 | 25 | 2 | 52 | 125 | A | A | A | AA | Inventive |

TABLE 5-continued

| Sample No. | Cellulose ester | Sugar ester | Stretching temperature (° C.) | Stretching rate (%) | Condition of saponification treatment | Retardation (nm) Ro | Rth | Xa | Before and after a moisture-heat durability test Change ratio Ro | Rth | Inner haze difference | Remarks |
|---|---|---|---|---|---|---|---|---|---|---|---|---|
| 205 | 1 | 1 | 170 | 20 | 3 | 52 | 125 | AA | AA | AA | AA | Inventive |
| 206 | 2 | 1 | 160 | 22 | 3 | 52 | 125 | AA | A | AA | AA | Inventive |
| 207 | 4 | 1 | 170 | 35 | 3 | 52 | 125 | AA | AA | AA | A | Inventive |
| 208 | 5 | 1 | 170 | 40 | 3 | 52 | 125 | A | A | AA | A | Inventive |
| 209 | 4 | 6 | 160 | 36 | 2 | 52 | 125 | B | A | A | C | Comparative |
| 210 | 4 | 7 | 160 | 36 | 2 | 52 | 125 | C | C | C | C | Comparative |
| 211 | 4 | 9 | 160 | 36 | 2 | 52 | 125 | C | C | C | C | Comparative |

From Table 5, it turns out that in the retardation film of the present invention, when the saponification is weak, reduction of a stretching rate by use of a cellulose ester with a low degree of substitution enable to produce a retardation film with a small haze change.

Further, when the saponification condition is strong, it turns out that the use of cellulose acetate positioned at a higher degree substitution side enable to produce a retardation film to improve both retardation fluctuation and inner haze fluctuation.

Example 3

Production of Retardation Films 301 and 302

The retardation films 301 and 302 having been subjected to the saponification conditions 1 and 2 respectively were produced in the same way as those in Example 1 except that the composition of the main dope was changed as follows, and the retardation films 301 and 302 were evaluated similarly to Example 1. The results are shown in Table 6.

<Composition of the Main Dope>

| | |
|---|---|
| Methylene chloride | 340 parts by weight |
| Ethanol | 64 parts by weight |
| Cellulose ester (a degree of substitution of acetyl group being 2.40) | 100 parts by weight |
| Sugar ester compound 1 | 10 parts by weight |
| Ester compound represented by the general formula (2): 2-15 | 3 parts by weight |
| Particle additive liquid | 1 part by weight |

TABLE 6

| Sample No. | Cellulose ester | Sugar ester | Film thickness (μm) | Stretching temperature (° C.) | Stretching rate (%) | Retardation (nm) Ro | Rth | Xa | Before and after a moisture-heat durability test Change ratio Ro | Rth | Inner haze difference | Remarks |
|---|---|---|---|---|---|---|---|---|---|---|---|---|
| 301 | 3 | 1 | 40 | 160 | 36 | 52 | 125 | A | A | A | A | Inventive |
| 302 | 3 | 1 | 40 | 160 | 36 | 52 | 125 | AA | A | AA | AA | Inventive |

From Table 6, it turns out that the content of the ester compound represented by the general formula (2) enables the retardation film to have more excellent wet-heat durability.

Example 4

Production of a Retardation Film 401

A-1 was added in an amount of 1.3 mass % in a sugar ester compound, there by producing a sugar ester compound 15 with 2.5% of the A-1 component. The average degree of substitution of each was 5.2. A retardation film containing these compounds having been subjected to the saponification treatment (saponification treatment condition 1) was produced in the same way as those in Example 1 and made the retardation film 401. The retardation film 401 was evaluated similarly to Example 1. The results are shown in Table 7.

TABLE 7

| Sample No. | Cellulose ester | Sugar ester | Film thickness (μm) | Stretching temperature (°C.) | Stretching rate (%) | Retardation (nm) Ro | Rth | Xa | Before and after a moisture-heat durability test Change ratio Ro | Rth | Inner haze difference | Remarks |
|---|---|---|---|---|---|---|---|---|---|---|---|---|
| 107 | 4 | 1 | 40 | 160 | 36 | 52 | 125 | AA | AA | AA | AA | Inventive |
| 401 | 4 | 15 | 40 | 160 | 36 | 52 | 125 | A | A | A | A | Inventive |

From Table 7, it turns out that in the case where the sugar ester compound has a content mass ratio of a component with a degree of substitution of 8.0 being 2.0% or less, the retardation film becomes more excellent in the wet heat durability.

Example 5

Production of a Polarizing Plate

A polyvinyl alcohol film with a thickness of 120 μm was uni-axially stretched (at a temperature of 110° C., a stretching rate of 5 times).

This polyvinyl alcohol film was immersed in an aqueous solution composed of 0.075 g of iodine, 5 g of potassium iodide, and 100 g of water for 60 seconds, and successively immersed in an aqueous solution composed of 6 g of potassium iodide, 7.5 g of boric acid, and 100 g of water with a temperature of 68° C. for 60 seconds. The resulting polyvinyl alcohol film was washed with water and dried, thereby obtaining a polarizer.

Subsequently, in accordance with the following steps 1 to 5, a polarizer, the above-mentioned retardation films, and Konica Minolta TAC KC4UY (cellulose ester film manufactured by Konica Minolta Opt. Inc.) positioned at the back side, were pasted, thereby producing polarizing plates 1-41.

Process 1: By being immersed in a 2 mol/L sodium hydroxide solution at 60° C. for 90 seconds, followed by being washed with water and dried, a retardation film with a side which was saponified to be passed with a polarizes and Konica-Minolta TAC KC8UY were obtained.

Process 2: The above polarizer was immersed in a tank of a polyvinyl alcohol adhesive with a solid content of 2 mass % for 1 to 2 seconds.

Process 3: Superfluous adhesive adhering at Process 2 to the polarizer was lightly wiped and removed, and then the polarizer was arranged so as to be placed on the retardation film which was treated at Process 1.

Process 4: The retardation film and the polarizer which were laminated at Process 3, and further the Konica Minolta TAC KC8UY positioned at the back side, were pasted to each other with a pressure of 20 to 30 N/cm² and a conveying speed of about 2 m/minute.

Process 5: The sample, in which the retardation film, the polarizer, and the Konica Minolta TAC KC8UY were pasted to each other at Process 4, was dried for 2 minutes in a drying machine with a temperature of 80° C., whereby a polarizing plate was produced for each of the retardation films.

<Production of a Liquid Crystal Display Device>

The liquid crystal panel to be subjected to the measurement of view angles was produced in the following way and evaluated in terms of characteristics as the liquid crystal display device.

The polarizing plates pasted beforehand at the both surfaces of the glass plate of a liquid crystal cell in a 40-inch type display BRAVIA X1 manufactured by SONY were peeled off, and then the polarizing plates produced in the above were pasted on the both surfaces of the glass plate.

At that time, the pasting orientation of the polarizing plate was performed such that the surface of the retardation film becomes the liquid crystal cell side and its absorption axis is oriented to the same direction as that of the polarizing plate pasted beforehand, and the liquid crystal display device was produced for each of the polarizing plates. The results are shown in Tables 8 and 9.

<<Evaluation>>

(Evaluation of a View Angle)

For each of the liquid crystal display devices, the average value of the contrast ratios (white transmittance/black transmittance) in vertical and horizontal directions at a polar angle was obtained by use of a measuring device (EZ-Contrast 160D, manufactured by ELDIM Corporation).

AA: 40 to 50

A: 20 to less than 40

C: 10 to less than 20

(Front Contrast of a Liquid Crystal Display Device)

The front contrast was measured for each of the liquid crystal display devices. In the measurement of the front contrast, a light amount of each of at the time of white indication and at the time of black indication was measured by a front contrast measuring apparatus (EZ-contrast) manufactured by ELDIM Corporation. The measurement results were ranked by attaching superiority or inferiority as follows based on the value of the front contrast.

AA: Front contrast ratio=3000:1 or more

A: Front contrast ratio=2999:1 to 2000:1

B: Front contrast ratio=1999:1 to 1000:1

C: Front contrast ratio=999:1 or less

TABLE 8

| Polarizing plate and polarizing plate No. | Optical film sample No. | View angle | Front contrast | Remarks |
|---|---|---|---|---|
| 1 | 101 | A | A | Inventive |
| 2 | 102 | A | A | Inventive |
| 3 | 103 | A | A | Inventive |
| 4 | 104 | C | C | Comparative |
| 5 | 105 | A | A | Inventive |
| 6 | 106 | A | A | Inventive |
| 7 | 107 | AA | AA | Inventive |
| 8 | 108 | A | B | Inventive |
| 9 | 109 | A | A | Inventive |
| 10 | 110 | A | A | Inventive |
| 11 | 111 | A | A | Inventive |
| 12 | 112 | C | C | Comparative |
| 13 | 113 | C | C | Comparative |
| 14 | 114 | A | B | Inventive |
| 15 | 115 | C | C | Comparative |
| 16 | 116 | AA | AA | Inventive |
| 17 | 117 | A | B | Inventive |
| 18 | 118 | A | A | Inventive |
| 19 | 119 | C | C | Comparative |
| 20 | 120 | C | C | Comparative |
| 21 | 121 | AA | AA | Inventive |
| 22 | 122 | A | A | Inventive |
| 23 | 123 | A | A | Inventive |
| 24 | 124 | A | A | Inventive |
| 25 | 125 | A | A | Inventive |
| 26 | 126 | A | A | Inventive |
| 27 | 127 | C | C | Comparative |

TABLE 9

| Polarizing plate and polarizing plate No. | Optical film sample No. | View angle | Front contrast | Remarks |
|---|---|---|---|---|
| 28 | 201 | A | A | Inventive |
| 29 | 202 | A | A | Inventive |
| 30 | 203 | AA | AA | Inventive |
| 31 | 204 | A | A | Inventive |
| 32 | 205 | AA | AA | Inventive |
| 33 | 206 | A | A | Inventive |
| 34 | 207 | A | A | Inventive |
| 35 | 208 | A | A | Inventive |
| 36 | 209 | A | B | Comparative |
| 37 | 210 | C | C | Comparative |
| 38 | 211 | C | C | Comparative |
| 39 | 301 | A | A | Inventive |
| 40 | 302 | A | AA | Inventive |
| 41 | 401 | A | A | Inventive |

From Tables 8 and 9, it turns out that the retardation film of the present invention, the polarizing plate and the liquid crystal display device which use it are excellent in view angle and front contrast as compared with Comparative examples.

The invention claimed is:

1. An optical retardation film having an inner haze of 0.02 or less at 23° C. and 55% RH, comprising:
  a cellulose ester composition comprising a cellulose ester resin which has a degree of substitution of total acyl groups being 2.0 to 2.55; and
  a compound represented by Formula (1),

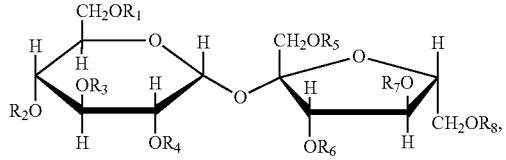

Formula (1)

wherein:
R$_1$ to R$_8$ each represents a substituted or unsubstituted alkyl carbonyl group or a substituted or unsubstituted aryl carbonyl group; and
R$_1$ to R$_8$ may be the same with or different from each other; the compound has an average degree of substitution of 3.0 to 6.0 and contains a component with a degree of substitution of 4 or less in an amount of 30 mass % to 80 mass %, and the retardation film has an inner haze variation amount of 0.03 or less due to a temperature and humidity change from 23° C. and 55% RH to 60° C. and 90% RH; and a retardation value Ro, defined by the following formula (i), of 30 to 90 nm with a retardation value Rt, defined by the following formula (ii), of 70 to 300 nm, $$Ro=(nx-ny) \times d \quad \text{Formula (i)}$$

$$Rth=\{(nx+ny)/2-nz\} \times d \quad \text{Formula (ii)}$$

wherein nx represents a refractive index in a film in-plane slow axis direction; NY represents a refractive index in a film in-plane fast axis direction, nz represents a refractive index in a thickness direction, and d represents a thickness (nm) of the film, under the environment of a temperature of 23° C. and a humidity of 55% RH, at a wavelength of 589 nm.

2. The retardation film described in claim 1, further comprising an ester compound represented by Formula (2), $$B\text{-}(G\text{-}A)n\text{-}G\text{-}B \quad \text{Formula (2)}$$

wherein:
B represents a hydroxy group or a carboxylic acid residue;
G represents an alkylene glycol residue with 2 to 12 carbons, an aryl glycol residue with 6 to 12 carbons, or an oxy alkylene glycol residue with 4 to 12 carbons;
A represents an alkylene dicarboxylic acid residue with 4 to 12 carbons or an aryl dicarboxylic acid residue with 6 to 12 carbons; and
"n" represents an integer of 1 or more.

3. The retardation film described in claim 1, wherein a component with a degree of substitution of 8.0 has a content mass ratio of 2% or less in the compound represented by Formula (1).

4. A polarizing plate, comprising:
a polarizer; and
the retardation film described in claim 1 and pasted on at least one surface of the polarizer.

5. A liquid crystal display device, comprising:
a liquid crystal cell; and
the polarizing plate described in claim 4 and disposed on at least one surface of the liquid crystal cell.

* * * * *